US 7,155,377 B2

(12) United States Patent
Porter et al.

(10) Patent No.: US 7,155,377 B2
(45) Date of Patent: Dec. 26, 2006

(54) METHOD AND SYSTEM FOR CALCULATING THE SPATIAL-TEMPORAL EFFECTS OF CLIMATE AND OTHER ENVIRONMENTAL CONDITIONS ON ANIMALS

(75) Inventors: Warren P. Porter, Madison, WI (US); John W. Mitchell, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1056 days.

(21) Appl. No.: 09/938,196

(22) Filed: Aug. 23, 2001

(65) Prior Publication Data

US 2003/0040895 A1    Feb. 27, 2003

(51) Int. Cl.
*G06G 7/48* (2006.01)
*A61B 5/00* (2006.01)
*C05F 1/00* (2006.01)

(52) U.S. Cl. ............................ 703/11; 71/15; 600/300
(58) Field of Classification Search .................... 703/2, 703/6, 9, 11; 702/2, 3, 19, 179, 188, 5; 119/174; 700/29, 30, 31, 32, 33, 36; 71/15; 600/300
See application file for complete search history.

(56) References Cited

U.S. PATENT DOCUMENTS

| | | | | |
|---|---|---|---|---|
| 4,884,366 A | * | 12/1989 | Morton | 47/62 C |
| 4,992,942 A | * | 2/1991 | Bauerle et al. | 700/284 |
| 5,019,998 A | * | 5/1991 | Cowan et al. | 703/13 |
| 5,130,925 A | * | 7/1992 | Janes et al. | 702/2 |
| 5,322,035 A | * | 6/1994 | Hawes et al. | 119/227 |
| 5,673,366 A | * | 9/1997 | Maynard et al. | 706/14 |
| 5,808,916 A | * | 9/1998 | Orr et al. | 703/6 |
| 5,870,302 A | * | 2/1999 | Oliver | 700/11 |
| 5,884,225 A | * | 3/1999 | Allen et al. | 702/3 |
| 5,966,129 A | * | 10/1999 | Matsukuma et al. | 345/418 |
| 6,009,838 A | * | 1/2000 | Carver et al. | 119/500 |

(Continued)

FOREIGN PATENT DOCUMENTS

EP          0610163 A1 *  8/1994

(Continued)

OTHER PUBLICATIONS

Semtner, Ocean and Climate Modeling, ACM Apr. 2000.*

(Continued)

*Primary Examiner*—Paul Rodriguez
*Assistant Examiner*—Thomas H. Stevens
(74) *Attorney, Agent, or Firm*—Patricia Smith King

(57) ABSTRACT

The present invention is a system and method for accurately calculating the spatial-temporal effects of a variety of environmental conditions on animal individual, population and community dynamics, given the animal's temperature-dependent behaviors, morphology and physiology, by running integrated microclimate and animal models to calculate the discretionary energy and water available to the animal and its activity time. The methodology requires relatively few, easily measured data to perform the calculations. The microclimate model translates a set of climate and other environmental conditions into a set of microclimate conditions experienced by an animal, given a set of the animal's characteristics. The animal model uses the microclimate conditions data and the set of animal characteristics data to solve for several animal conditions. Further calculations and several display options are available to a user, including spatial-temporal analyses. The method is implemented by use of a client-server system employing a graphical user interface, and a programming structure that allows for use of the methodology with personal computers, despite the large sizes of the databases that must be accessed. The method may also be implemented on individual computers.

93 Claims, 13 Drawing Sheets

U.S. PATENT DOCUMENTS

| | | | | |
|---|---|---|---|---|
| 6,035,710 | A * | 3/2000 | Hutchison et al. | 702/3 |
| 6,058,387 | A * | 5/2000 | Campbell et al. | 706/60 |
| 6,115,692 | A * | 9/2000 | Liu et al. | 705/8 |
| 6,141,019 | A * | 10/2000 | Roseborough et al. | 345/473 |
| 6,159,371 | A * | 12/2000 | Dufay | 210/602 |
| 6,321,181 | B1 * | 11/2001 | Havens | 703/6 |
| 6,345,240 | B1 * | 2/2002 | Havens | 700/100 |
| 6,356,842 | B1 * | 3/2002 | Intriligator et al. | 702/3 |
| 6,507,353 | B1 * | 1/2003 | Huard et al. | 715/863 |
| 6,537,213 | B1 * | 3/2003 | Dodds | 119/174 |
| 6,581,008 | B1 * | 6/2003 | Intriligator et al. | 702/3 |
| 6,782,321 | B1 * | 8/2004 | Burton | 702/5 |
| 6,856,907 | B1 * | 2/2005 | Rosenblum et al. | 702/2 |

FOREIGN PATENT DOCUMENTS

| | | | |
|---|---|---|---|
| RU | | 2124828 C1 * | 1/1997 |

OTHER PUBLICATIONS

Chapman and Thornes, The Use of Geographical Information Systems in Climatology and Meterology, 2002.*

Yang, GIS Modeling in Coastal Flooding Analysis: A Case Study in the Yellow River Delta, China, IEEE 1997.*

Baumann et al., The RasDaMan Approach to Multidimensional Database Management, ACM 1997.*

Corbit and DeVarco, SciCentr and BioLeam: Two 3D Implementations of CVE Science Museums, ACM 2000.*

Mechoso et al., Distribution of a Climate Model Across High Speed Networks, ACM 1991.*

Nehme and Simoes, Spatial Decision Support System for Land Assessment, ACM GIS 1999.*

Mahinthakumar et al., Multivariate Geographic Clustering in a MetaComputing Environment Using Gobus, Jan. 1999.*

MacEachren et al., Virtual Environments for Geographic Visualization: Potential and Challenges, ACM 1999.*

Deutschman et al., The Role of Visualization in Understanding a Complex Forest Simulation Model, ACM 2000.*

Zheng et al., The Effects of Silvicultural Treatments on Summer Forest Microclimate in Southeastern Missouri Ozarks, Climate Research, Inter-Research May 15, 2000.*

Porter et al., "Enotherm Energetics: from a Scalable Individual-based Model to Ecological Applicants" Aust. J. Zoo. Sep. 2001. pp. 126-162.*

Grant et al., "Modeling Global Macroclimatic Constraints on Ectotherm Energy Budgets" Amer. Zool. 1992. pp. 154-178.*

Porter, W.P., et al., "Behavioral Implications of Mechanistic Ecology," Oeclogia, 1st ed., p. 1-54, ( 1973).

McCullough and Porter, "Computing clear day solar radiation spectra for the terrestrial ecological environment," Ecology, vol. 52 ( No. 6), p. 1008-1015, ( 1971).

Warren P. Porter, et al., "Endotherm energetics: from a scalable individual-based model to ecological applications," Aust. J. Zool., p. 125-162, ( 1994).

Warren P. Porter et al., "Calculating climate effects on birds and mammals: impacts on biodiversity, conservation, population parameters, and global community structure.," Amer. Zool., p. 597-630, ( 2000).

Warren P. Porter, et al., "Physiology on a landscape scale: plant-animal interactions," Warren—Published Yet? Details?, ( 2001).

Adolph, S.C. and W.P. Porter, "Growth, seasonality, and lizard life histories: Age and size at maturity.," Oikos, p. 267-278, ( 1996).

Porter and McClure, "Climate effects on growth and reproduction potential in Sigmodon hispidus and Peromyscus maniculatus.," Winter Ecology of Small Mammals, p. 173-181, ( 1984).

W.P. Porter, "New animal models and experiments for calculating growth potential at different elevations.," Physiological Zoology, p. 286-313, ( 1989).

Adolph, S.C. and W.P. Porter, "Temperature, activity, and lizard life histories.," Am. Naturalist, p. 273-295, ( 1993).

Budaraju. S. et al., "Prediction of forced ventilation in animal fur from a measured pressure distribution," Proc. Roy. Soc. London B, p. 41-46, ( 1994).

Bartlett, P. N. and D.M. Gates, "The energy budget of a lizard on a tree trunk," Ecology, p. 315-322, ( 1967).

Mitchell, J.W., "Heat transfer from spheres and other animal forms. ," Biophys. J., p. 561-569, ( 1976).

Mitchell, J.W. and G.E. Myers, "An analytical model of the counter-current heat exchange phenomena," Biophys. J., ed., , p. 897-911, ( 1968).

Wathen, P. et al., "Theoretical and experimental studies of energy exchange form jack rabbit ears and cylindrically shaped appendages," Biophys. J., vol. 11 (No. 12), p. 1030-1047, ( 1971).

Wathen, P. et al., "Heat transfer from animal appendage shapes-cylinders, arcs, and cones.," Trans. of the ASME, p. 536-540, (1974).

Kowalski, G. J. and J.W. Mitchell, "Heat transfer from spheres in the naturally turbulent, outdoor environment.," J. Heat Transfer, vol. 98 ( No. 4), p. 649-653, ( 1976).

Beckman, W.A. et al., "Thermal model for prediction of a desert iguana's daily and seasonal behavior.," Trans. ASME, p. 1-7, (1971).

Mitchell, J.W. et al (EDS), "Microclimatic modeling of the desert," Scripta Book Co. (Washington, DC), p. 275-286, ( 1975).

Grant, B.W. and W.P. Porter, "Modeling global macroclimatic constraints on ectotherm energy budgets," Am. Zool., p. 154-178, (1992).

Budaraju, S. et al., "Mixed convective heat and moisture transfer from a horizontal furry cylinder in transverse flow.," Int. J. Heat and Mass Transfer, p. 22273-2281, (1997).

Stewart, W.E. et al., "Prediction of forced ventilation in animal fur under ideal pressure distribution.," Functional Ecology, p. 487-492, (1993).

* cited by examiner

FIG. 5a

| VARIABLE | DEFINITION |
|---|---|
| abs | Absorbed (unless otherwise noted). |
| ABSAN | Animal absorptivity. |
| ABSSB | The absorptivity of the substrate. |
| ashade | Percent shade on the animal. |
| ASILN | Silhouette area normal to the sun. |
| B1ARA(1) | A variable that indicates the optical thickness of the fur or feathers; it is the exponent of Beer's Law (i.e. the extinction coefficient ($\tau$)times the depth of fur/feathers (t)). |
| BETARA(2) | The IR extinction coefficient of fur/feathers. |
| BICV | A dimensionless variable for convection heat transfer. |
| BIR | A dimensionless variable for IR heat transfer. |
| C1N | Is C1 normalized; a dimensionless variable. |
| d | Defecated |
| D1 | D1 is a dimensionless variable. |
| DigEff | Digestive efficiency. |
| dir | Direct. |
| discr | Discretionary. |
| EMIS | The emissivity of the animal. |
| evap | Evaporated. |
| f | Food (dry food). |
| Fa,grd | The configuration factor between the animal and the ground. |
| Fa,sky | The configuration factor between the animal and the sky. |
| Fabush | The configuration factor between the animal and the nearby object. |
| g | The heat generation per unit volume. |
| gfatpg, gprotpg, gcarbpg | The grams of fat, protein, and carbohydrate per gram dry mass of food. |
| gr | Growth. |
| grd | Ground or other surface. |
| gundig | Undigested mass per gram dry mass of food. |

FIG. 5b

| gw | Grams water. |
|---|---|
| HC | HC is the convection heat transfer coefficient. |
| hor | Horizontal to. |
| HR | HR is the radiant heat transfer coefficient. |
| i | Ingested. |
| IR | Infrared. |
| Jabspgr | Joules absorbed per gram of dry food. |
| K | Thermal conductivity for tissue. |
| KEFAR | KEFAR is the effective thermal conductivity of fibers and air for conduction. |
| KRADSKY/ GRD/BUSH | The fur/feather radiant conductivity in the sky/ground/bush direction. |
| M | Mass. |
| Mdiscr | Total discretionary mass; Mw,discr + Mf,discr. |
| met | Metabolism. |
| Mf,a | Mass of food absorbed. |
| Mf,d | Mass of food defecated. |
| Mf,discr | Total discretionary mass from food; Mf,gr + Mf,rep + Mf,s. |
| Mf,gr | Discretionary mass from food available for growth. |
| Mf,i | Mass of food ingested. |
| Mf,met | Mass of food metabolized. |
| Mf,rep | Discretionary mass from food available for reproduction. |
| Mf,s | Discretionary mass from food stored. |
| Mf,w | Mass of water in food absorbed (Mf,a). |
| Mw,a | Mass of water absorbed. |
| Mw,d | Mass of water defecated in feces. |
| Mw,discr | Total discretionary mass from water (Mw,gr + Mw,rep + Mw,s). |
| Mw,gr | Discretionary mass from water available for growth. |
| Mw,i | Mass of water ingested. |
| Mw,met | Mass of water metabolized. |
| Mw,rep | Discretionary mass from water available for reproduction. |
| Mw,s | Discretionary mass from water stored. |
| Mw,u | Mass of water excreted in urine. |
| n | Geometry constant (varies with shape). |
| norm | Normal to. |

FIG. 5c

| PCTDIF | Percent diffuse solar radiation. |
|---|---|
| pctfat, pctpro, pctcar | User specified percentages of these components of food – fat, protein, carbohydrates. |
| PSI | PSI is a correction factor. |
| Q | Heat. |
| Qcond | Conduction (via air and fur/feathers) from dorsal and ventral sides of animal. |
| Qcond,air | Conduction via the air. |
| Qcond,hair | Conduction via the fur/feathers. |
| Qconv | Convection at the fur-air interface. |
| Qdiscr | Discretionary energy available to the animal. |
| Qdorsl | Amount of energy absorbed on the top/dorsal parts of animal. |
| Qevap,resp | Energy loss by evaporation in respiration. |
| Qevap,skin | Energy loss by evaporation at skin. |
| Qfur | Energy flux via the fur/feathers. |
| Qgen | The metabolic heat generation needed to maintain the animal's core temperature. |
| Qin | the amount of heat entering the animal from external sources (Qsolar,a, QIR,in, QIR,sky, QIR,grd, other sources). |
| QIR,above | The IR fluxes from above the animal. |
| QIR,below | The IR fluxes from below the animal. |
| QIR,grd | IR fluxes from the ground (or other surface). |
| QIR,in | IR radiation emitted inward through the porous insulation. |
| QIR,out | IR radiation emitted outward from the fiber elements toward the sky |
| QIR,sky | IR fluxes from the sky. |
| QIR,veg | IR fluxes from vegetation. |
| Qmet | Uniform heat generation. |
| Qnet | Net heat exchange for the whole animal. |
| Qnorm | Total solar radiation incident on a surface normal to the sun's direct beam. |
| Qout | the amount of heat leaving the animal to the environment. |
| QRADSK/ GRD/BUSH | The incoming solar IR radiation from the sky/ground/bush through the porous media. |
| Qresp | Uniform heat dissipation by respiration. |
| QSDIFF | The total amount of diffuse solar radiation. |

FIG. 5d

| QSOBJ | Incoming diffuse radiation reflected by an object nearby. |
|---|---|
| Qsolar | Clear sky solar radiation. |
| Qsolar,a | Amount of solar radiation (watts) absorbed by the animal. |
| Qsolar,dir | Direct beam solar radiation. |
| Qsolar,hor | The incoming solar radiation on a horizontal surface. |
| QSRSB | The incoming solar radiation reflected from the substrate (i.e. ground or other substrate). |
| QSSKY | The diffuse solar radiation from the sky (i.e. solar radiation scattered by molecules in the atmosphere and by clouds). |
| Qventr | Amount of energy absorbed on the bottom/ventral parts of animal. |
| R | Radius of animal. |
| Rep | Reproduction. |
| resp | Respiration. |
| RH | Relative humidity of air passing over the animal at its average height above ground. |
| RQ | Respiratory quotient.. |
| S | Stored. |
| sig | The Stefan-Boltzmann constant. |
| Tair | Air temperature at animal's average height. |
| Tair,2m | Temperature of air at 2 m height. |
| TAVsky/grd/bush | Sky/ground/bush portions of radiant heat exchange (degrees K). |
| Tgrd | Ground/surface temperature. |
| Tgrd(i) | The ground temperature at location (i). |
| Timbas | Basal multiplier (i.e. activity above resting). |
| TK | Temperature at degrees Kelvin. |
| TKair,TKskin, TKsky, TKbush | The temperatures of air, skin, sky, bush, respectively, in degrees K. |
| TOTCARB | Total carbohydrates. |
| TotJpgram | Joules per gram dry food. |
| Tskin | The skin temperature of the animal. |
| Tsky | Clear sky radiant temperature. |
| Tveg | Temperature of vegetation (or other objects) overhead of the animal. |
| U | Urine. |
| V | Velocity of air passing over the animal at its average height above ground. |
| w | Water. |
| Mw,evap | Mass of water lost by evaporation (Mw,evap,resp + Mw,evap,skin). |
| Mw,evap,resp | Water loss by evaporation in respiration. |
| Mw,evap,skin | Water loss by evaporation at skin. |
| ZFURAR | ZFURAR is the depth of fur. |

FIG. 7
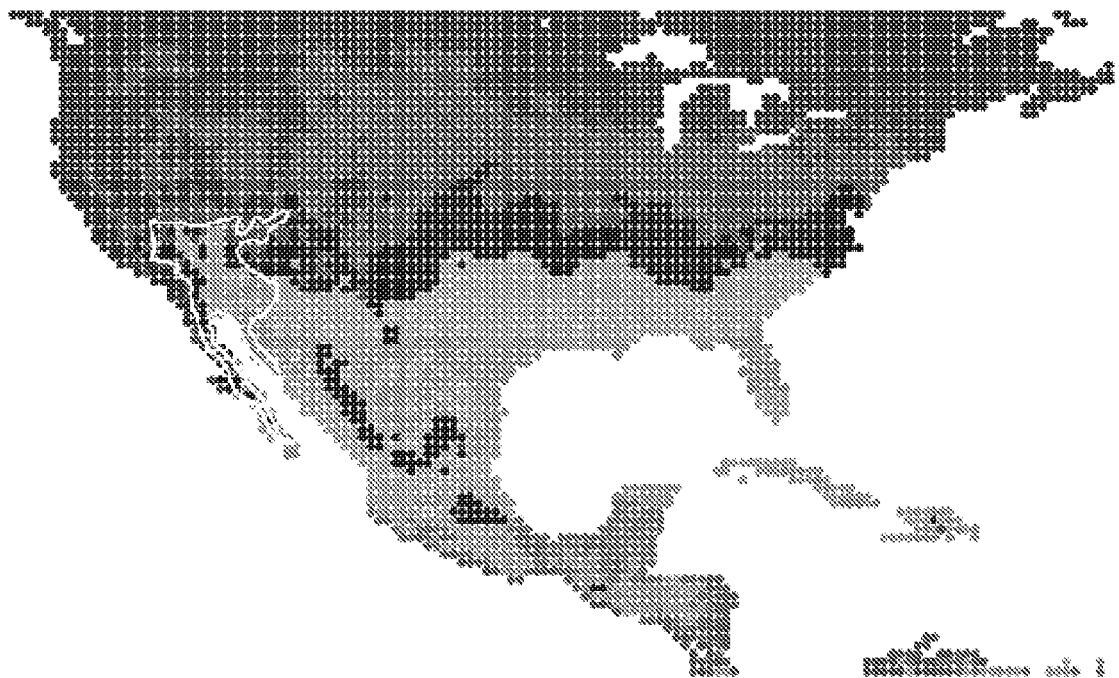
Degree days at 10 cm depth:
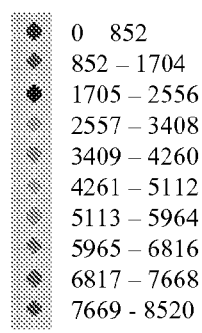
0  852
852 – 1704
1705 – 2556
2557 – 3408
3409 – 4260
4261 – 5112
5113 – 5964
5965 – 6816
6817 – 7668
7669 - 8520

Discretionary energy in July as a function of slope and aspect of topography
for Mountain Lion (kJ/d)

- ◯ 13298 - 18751
- ◯ 11165 - 11755
- ● 9736 - 10644
- ◯ 11755 - 13298
- ◉ 10644 - 11165

METHOD AND SYSTEM FOR CALCULATING THE SPATIAL-TEMPORAL EFFECTS OF CLIMATE AND OTHER ENVIRONMENTAL CONDITIONS ON ANIMALS

BACKGROUND

The present invention relates to methods for predicting the effects of climate and other environmental conditions on the well-being of animals. Specifically, it relates to a method for accurately calculating the spatial-temporal effects of a variety of environmental conditions on animal individual, population and community dynamics, given the animal's temperature-dependent behaviors, morphology and physiology, by running integrated microclimate and animal models to calculate the discretionary energy and water available to the animal and its activity time.

Animals are affected by the climate and other environmental conditions in which they live. Climate affects animal heat and mass balance and, consequently, body temperature. Spatial and temporal variation in the thermal environment provides a template on which physiological, population and community dynamics are played out. A current challenge in biology is understanding how and when those environmental conditions affect developmental processes and function during the lives of animals. An ability to calculate those effects would enable more accurate prediction and informed decision-making in the management of animal environments. Current trends in global climate shifts, land use and changes to other environmental conditions such as diseases and increases in pesticide use, drive the need for a means to accurately predict their effects to prevent, or at least diminish, their negative impacts on the well-being of animals. The problem is how to model the spatial-temporal effects of climate and other environmental conditions on animals to enable the accurate calculation of those effects.

Explicit calculations of how climate affects animal heat and mass balance, and the consequences for body temperature, were first made in the 1960's (Norris, K. S. 1967. *Color adaptation in desert reptiles and its thermal relationships*. In: Symposium on lizard ecology, pp. 162–229. U. of Missouri Press, Columbia, Missouri; Bartlett, P. N. and D. M. Gates, 1967. *The energy budget of a lizard on a tree trunk*. Ecology 48:315–322). Those early models were limited by the lack of models for distributed heat generation internally, distributed evaporative water loss internally, and a first principles model of gut and lung function. Also missing were a first principles model of porous insulation for fur or feathers, an appendage model, and a general microclimate model that could use local macroclimate data to calculate the range of local microenvironments above and below ground.

Since then, several developments have occurred to improve our ability to model the effects of environmental conditions on animals. These include the estimation of convection heat transfer properties from the volume of an animal (Mitchell, J. W. 1976. *Heat transfer from spheres and other animal forms*. Biophys. J. 16:561–569), a countercurrent heat exchange model for appendages and modifications based on appendage shapes (Mitchell, J. W. and G. E. Myers, 1968. *An analytical model of the counter-current heat exchange phenomena*. Biophys. J. 8(8):897–911; Wathen, P. et al., 1971. *Theoretical and experimental studies of energy exchange from jack rabbit ears and cylindrically shaped appendages*. Biophys. J. 11(12):1030–1047; Wathen, P. et al., 1974. *Heat transfer from animal appendage shapes-cylinders, arcs, and cones*. Trans. of the ASME. November. 40:536–540), the ability to understand the effects of convective heat transport (Kowalski, G. J. and J. W. Mitchell, 1976. *Heat transfer from spheres in the naturally turbulent, outdoor environment*. J. Heat Transfer 98(4):649–653), the development of a general purpose microclimate model (Beckman, W. A. et al., 1971. *Thermal model for prediction of a desert iguana's daily and seasonal behavior*. Trans. ASME Paper No. 71-WA/HT-35:1–7; Porter, W. P. et al., 1973. *Behavioral implications of mechanistic ecology. Thermal and behavioral modeling of desert ectotherms and their microenvironment*. Oecologia 13:1–54; Mitchell, J. W. et al. (eds) 1975. *Microclimatic modeling of the desert*, pp. 275–286. Scripta Book Co., Washington, D.C.), the ability to calculate the percent of thermally available habitat (Grant, B. W. and W. P. Porter 1992. *Modeling global macroclimatic constraints on ectotherm energy budgets*. Am. Zool. 32:154–178), the development of porous media models (Kowalski, G. J. 1978. *An analytical and experimental investigation of the heat loss through animal fur*. In: Department of Mechanical Engineering. University of Wisconsin, Madison, Wis.), the extension of the models to radial instead of Cartesian coordinates and the implementation of first principles fluid mechanics in the porous media (Stewart, W. E. et al., 1993. *Prediction of forced ventilation in animal fur under ideal pressure distribution*. Functional Ecology 7:487–492; Budaraju, S. et al., 1994. *Prediction of forced ventilation in animal fur from a measured pressure distribution*. Proc. Roy. Soc. London B 256:41–36; Budaraju, S. et al., 1997. *Mixed convective heat and moisture transfer from a horizontal furry cylinder in transverse flow*. Int. J. Heat and Mass Transfer 40:2273–2281), and a test of an ecotherm and microclimate model to estimate a species' survivorship, growth and reproduction at a continental scale (Adolph, S. C. and W. P. Porter, 1993. *Temperature, activity, and lizard life histories*. Am. Nat. 142:273–295; Adolph, S. C. and W. P. Porter, 1996. *Growth, seasonality, and lizard life histories. Age and size at maturity*. Oikos 77:267–278). However, none of these attempts have accomplished the goal of creating a fully integrated set of models that incorporate all of the conditions needed to accurately predict how animals (both ecotherm and endotherm) will react to changes in their environment.

SUMMARY

The present invention is directed to overcoming these limitations by providing a system and method to enable users to accurately calculate the effects of climate and other environmental conditions, and the spatial and temporal variation thereof, on the temperature dependent behavior and physiology of animals, and the subsequent effects of those same conditions on population dynamics and community structure.

Accordingly a methodology for accurately predicting the spatial-temporal effects of environmental conditions on animals is presented. Several objects and advantages of the present invention are:

a) to provide improved and fully integrated microclimate and animal models which may be used in coordination to accurately predict the effects of climate and other environmental conditions (including artificial environments) on animals, requiring relatively few, easily measured data to estimate food and water requirements, potential for activity time, growth, and reproduction for a wide variety of habitats;

b) to provide a methodology that can generate the information necessary to identify potential reserves and/or transplantation sites, and to modify and/or manage existing habitats to optimize the growth, reproduction and survivorship of threatened or endangered species;

c) to provide a method that enables the incorporation of the spatial-temporal variation in vegetation and topography in the analysis of the effects of environmental conditions, such as changes in global climate, land use, diseases and toxicants, on animals;

d) to provide a means to accurately calculate discretionary energy and water from first principles, thus enabling the calculation of growth and reproduction under any kind of environmental circumstance, and under any kinds of animal characteristics;

e) to provide a microclimate model with a solar radiation model incorporated therein, the solar radiation model enabling the input of solar radiation information from the geographic coordinates of the locality, thus eliminating the need for direct measurements at the site, the solar radiation model further allowing for the calculation of the effects of slope on the amount of solar radiation incident on the surface and for the calculation of solar radiation when the sun is positioned below the local horizon;

f) to provide a microclimate model able to calculate the effects of vegetation on the temperature and wind profiles, topography on air temperature profiles over elevation, and the effects of slope on the temperature;

g) to provide an interactive combination of heat and mass transfer engineering and specific aspects of an animal's morphology, physiology and temperature-dependent behaviors, to calculate an animal's preferred activity time (i.e., the time that minimizes size-specific heat/water loss);

h) to provide an animal model that incorporates a porous media model for insulation improved by the addition of a solar radiation component enabling the user to calculate the absorbed solar radiation when an animal is in the sunlight;

i) to provide a porous media model further improved by the addition of an appendage model for birds and other animals to account for energy fluxes at their appendages;

j) to provide an animal model further improved by the incorporation therein of molar balance models for the lungs and gut to allow for the coupling of food ingested to respiratory gas exchanges and evaporative water loss from the respiratory system;

k) to provide a means of estimating the food intake of animals in natural circumstances using a gut model based on first principles rather than regression analyses;

l) to provide an improved means of calculating heat loss from an endotherm by incorporating the effects of solar radiation and relative humidity as factors in the calculation;

m) to provide an animal model further improved by the incorporation therein of a thermoregulatory model that yields metabolic calculations as a function of temperature and incorporates temperature regulation responses by the animal to maintain a core-skin temperature gradient above a user-specified minimum value;

n) to provide a means of implementing the models such that a user may run the models with access to large databases of environmental and animal data on a variety of platforms, including a personal computer; and, o) to provide a means by which a user is able to specify the conditions set used by the model(s) and/or the results calculated by the model(s), in order to customize the model to the user's particular needs.

Further objects and advantages of the present invention will become apparent from a consideration of the drawings and ensuing description.

BRIEF DESCRIPTION OF DRAWINGS

In the accompanying drawings:

FIGS. 5a to 5d, present a key to the variables used in the drawings and algorithms.

FIG. 7, is a plot of the spatial variation in soil degree days in relation to the range of the Chuckwalla lizard, generated by the present invention to discover the effects of temperature on the lizard's distribution.

OVERVIEW

The present invention is a method and system for calculating the spatial-temporal effects of a variety of environmental conditions (including macroclimate, topography, vegetation and the like) on animal individual, population and community dynamics, given the animal's temperature-dependent behaviors, morphology and physiology. The method for the present invention comprises using two integrated models, a microclimate and animal model, to translate the environmental and animal conditions into their effects on an animal's energetics and behavior. The system of the present invention sets forth a way in which the methodology may be employed by users via a wide range of computerized platforms.

Figure 1:
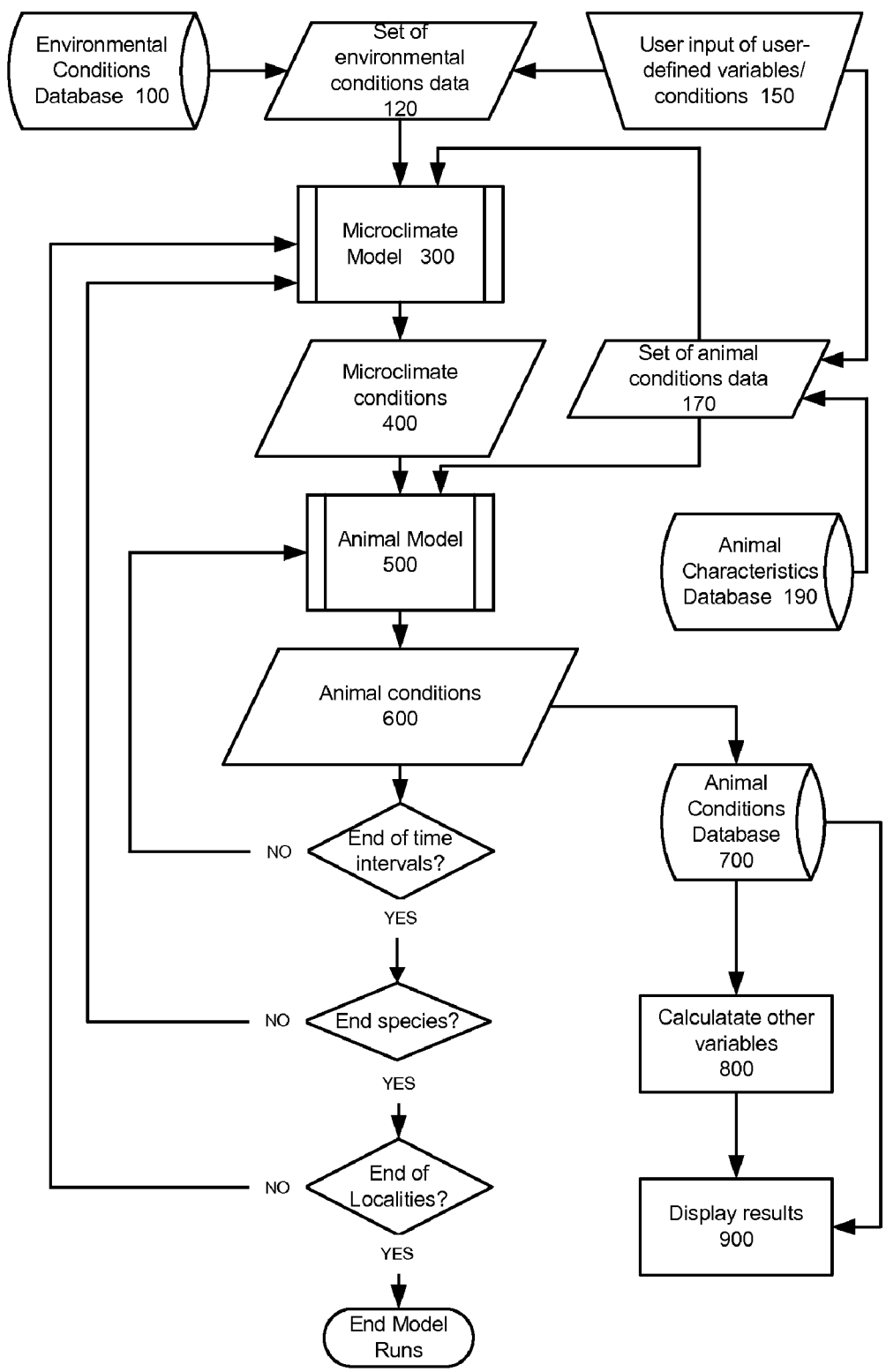
FIG. 1, is a flow diagram of the general method for the present invention that also represents a logic flow that can be implemented in discrete circuits.

Referring to FIG. 1, an overview of the method for the present invention is presented. The two integrated models of the present invention include a microclimate model 300 and an animal model 500. The microclimate model 300 translates the environmental conditions into the microclimatic conditions above and below ground that may be experienced by an animal at a specified location. The animal model 500 calculates the effects of the microclimatic conditions on an animal's metabolic and other variables. Those results are then available for further calculations aimed at assessing the ultimate effects of the environmental conditions on an animal's physiological performance, geographic distribution and community dynamics.

The microclimate model 300 of the present invention improves upon a basic model previously disclosed in Porter et al. 1973 (ref. above) and by McCullough and Porter (1971. *Computing clear day solar radiation spectra for the terrestrial ecological environment.* Ecology 52(6):1008–1015). The improvements to the microclimate model 300 include the incorporation therein of a solar radiation model. The solar radiation model enables the input of solar radiation information from the geographic coordinates of the animal's locality, eliminating the need for direct measurements at the site. The solar radiation model also allows for the calculation of solar radiation when the sun is positioned below the horizon in addition to when the sun is above. The microclimate model 300 is further improved in being able to calculate the effects of vegetation on the temperature and wind profiles, and the effects of slope on the temperature, as well as enabling a user to select the heights and depths above and below ground at which the microclimates are characterized.

The animal model 500 of the present invention builds upon the fact that in biological systems, mass and energy are interconnected. For example, the amount of mass consumed by an animal is related to the amount of chemical energy that can be liberated by metabolic processes in the form of heat. Earlier attempts to develop coupled equations of heat and mass balance to quantitatively measure the metabolic variables involved in each were reported in two earlier works (Porter, W. P. and P. A. McClure, 1984. *Climate effects on growth and reproduction potential in Sigmodon hispidus and Peromyscus maniculatus.* In: 'Winter Ecology of Small Mammals.' J. Merritt (ed), at pp. 173–181; W. P. Porter, 1989. *New animal models and experiments for calculating growth potential at different elevations.* Physiological Zoology 62: 286–313). These earlier developments illustrate that relatively few variables can govern processes at multiple levels of biological organization. For example, accurate solutions for the discretionary energy and mass of an animal may be used to calculate the life history variables of growth and reproduction, and solutions for the total annual activity time of an animal may be used to calculate survivorship. The fact that accurate calculations of these few metabolic variables can predict effects on animals, underpins the robustness and broad applicability of the animal model 500 of the present invention.

An earlier attempt to couple an animal model to a microclimate model in order to predict the effect of climate and other environmental conditions on animals, was reported in W. P. Porter et al. (1994. *Endotherm energetics: from a scalable individual-based model to ecological applications.* Aust. J. Zool., 42:125–162). The animal model 500 of the present invention builds upon this earlier attempt and incorporates several improvements that enable the model to more accurately predict the effects of environmental conditions on animals when integrated with the microclimate model 300, and that enable its application to both endothermic and ecotothermic animals.

These improvements of the animal model 500 of the present invention, are disclosed herein and include several additions or modifications to some of the components of the previous version, including: (1) the incorporation of a solar radiation component into the porous media insulation model to enable the calculation of absorbed solar radiation when the animal is exposed to light; (2) the inclusion of an appendage model to improve the accuracy of the heat balance analysis by inclusion of the heat exchanges at the appendages of large birds and mammals; (3) the inclusion of a novel thermoregulatory model that yields metabolic calculations as a function of temperature and incorporates temperature regulation responses (behavioral and physiological) by the animal to maintain a minimum core-skin temperature gradient; (4) the ability to track the time an animal is active/feeding to calculate a total annual activity time; and, (5) the inclusion of molar balance models for the lungs and gut to allow the coupling of food ingested to respiratory gas exchanges and evaporative water loss from the respiratory system.

The animal model 500 calculates heat (i.e., energy) and water mass balances for required animal expenditures that are contingent on their selected or maintained core temperature and, from that, further calculates the required wet food intake that is constrained to be no greater than the body mass per day. Activity time calculations depend on light or no light availability and local microclimates that may force heat or water stress and reduce or limit activity. Together, the subroutines of the model 500 comprise an integrated basic principles model for understanding animal energetics. When coupled with Geographical Information Systems (GIS) based information on climate, topography and vegetation, the integrated microclimate 300 and animal 500 models can be used to generate spatially explicit interpretations of animal energetics and behavior.

The method for implementing the present invention provides a means by which a user may run the models of the present invention with access to large environmental conditions and animal databases on a wide variety of computerized platforms, including a personal computer.

While the methods disclosed herein may be described and shown with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

Referring now specifically to the figures, in which identical or similar parts and/or steps are designated by the same reference numerals throughout, detailed descriptions of the method and system of the present invention are given. It should be understood that the following detailed descriptions relate to the best presently known embodiments of the invention. However the descriptions are not intended to limit the invention to those applications. Rather, the present invention is intended to apply to other types of animal individual, population, and community research, and any other application to which the technology may be beneficially applied. For example, the invention can be applied to other conservation applications and to the prediction of global and other climate changes on animal distribution, growth and survivorship, in order to develop intervention procedures to ensure their well being. The present invention can, therefore, assume numerous other embodiments, as will become apparent to those skilled in the art, without departing from the appended claims.

DETAILED DESCRIPTION—METHOD OF CALCULATING EFFECTS

The models of the present invention comprise several algorithms with terms that are defined in the following detailed description. Please refer to FIGS. 5a to 5d for a list of terms and their definitions.

a. Data Inputs

Referring to FIG. 1 (a flow diagram of the method for the present invention), two sets of data are distinguished as input to the microclimate 300 and animal 500 models of the present invention. One is a set of environmental conditions data 120 and the other is a set of animal characteristics data 170.

i. Set of Environmental Conditions Data 120

The environmental conditions data set 120 is a collection of data from an environmental conditions database 100 and from a user-defined set of variables and conditions 150.

The environmental conditions database 100 is comprised of data relating to climate, topography, soil type and vegetation per locality and time. These data may be available from public sources (such as the National Oceanic and Aeronautics Administration, NOAA) and/or other sources [e.g. soil properties and vegetation type data—may be generated by using programs designed to do so, from data collected at local biogeography labs, or from other sources (e.g. Ramankutty and Foley. 1999. *Estimating historical changes in global land cover. Croplands from 1700 to 1992. Global Biogeochemical Cycles* 13:997–1027); certain climate information—from individual climate stations and/or from global climate data sets (such as that of Leemans and Cramer. 1991. *The IIASA database for mean monthly values of temperature, precipitation and cloudiness on a global terrestrial grid*. Laxenburg, Austria, International Institute for Applied Systems Analysis); and, spatial locations data—from the United States Geological Survey (USGS)]. Climate data may include temperature, rainfall, wind velocity and direction, and solar and infrared (IR) radiation. Vegetation data may include type and abundance of plant cover. Topographic data may include the slope and aspect of the terrain and soil type. Other types of data may also be input to the models if desired by the user and as they become available.

The user-defined variables and conditions 150, input to the environmental conditions data set 120, may include a set of localities and definition of time intervals over which the models are to be run, the types of vegetation or other food type(s) that comprise an animal species' diet, and the preferred temperature range and average height above ground of the animal.

Localities may be defined by latitude and longitude (which, in 0.5 degree increments, define approximately 30×30 mi² areas), by use of the universal transverse Mercatur (UTM) grid system to define smaller areas in the range of 30×30 m², or by other means. Other locality size increments are also possible. By defining the localities set, a user may determine the geographic scale of the microclimate conditions data 400 and of the analysis generally. For example, the analysis of the present invention may span an animal species' home range at the individual level, the distribution of individuals at a particular population's level, or it may span the entire species' distribution worldwide.

Time intervals may likewise be defined so that the models (both microclimate 300 and animal 500) compute outcomes over customizable time intervals. For example, the time intervals may be specified to calculate hourly, daily, monthly, yearly or other time periods according to the user's desired analysis. In one embodiment, the time intervals will be set to analyze conditions during an average day of each month, over each month in a year to analyze animal conditions over an entire year.

ii. Set of Animal Characteristics Data 170

The animal characteristics data set 170 is a collection of data from an animal characteristics database 190 and from a user-defined set of variables and conditions 150.

The animal characteristics database 190, is a compilation of data over many species of animals. The animal characteristics database 190 includes data on a species' morphology, body allometry (i.e., dimensions, weight, geometry and the like), physiology (including core temperature) and other information. Morphological data include those relating to spatial reflectance and include mean length of fibers (i.e. fur or feathers), fiber density as a function of depth, fiber diameter, depth of insulation, and solar reflectivity and transmissivity of fibers.

In addition to the data available from the animal characteristics database 190, the user may define a set of variables and conditions 150 for the particular species of concern that also make up the animal characteristics data set 170. User defined variables and conditions 150 may include the average height of the particular animal species specified, the minimum coreskin temperature gradient, the animal's null condition [i.e. when it is active (e.g. whether it is diurnal, nocturnal, crepuscular), and/or where it is active (e.g. whether it is arboreal or fossorial)], the animal's food type and quality (i.e. the proportions of carbohydrate:protein: lipids; percent dry matter), percent digestive efficiency, percent water in feces, percent urea in urine, and a multiplier from 1 to 7 above basal metabolic energy requirements to specify food intake to meet current needs, among others. The user may define whether and what pollutants (such as pesticides) are present in the localities, and whether and what other species (e.g., competitors, predators, prey) are present. The user, by inputting particular types and values of the data, may generate model outputs customized to their particular inquiries.

b. Microclimate Model 300

The microclimate model 300 of the present invention functions to translate the set of environmental conditions data 120 (including large-scale macroclimatic information) into a description of the microclimates experienced by the animal. The model 300 is based on a basic model (hereinafter referred to as "basic model") previously disclosed as described below, but further incorporates several improvements thereto.

The improvements to the microclimate model 300 include the incorporation of a solar radiation model. The solar radiation model enables the input of solar radiation information from the geographic coordinates of a locality, eliminating the need for direct measurements at the site. The solar radiation model also allows for the calculation of solar radiation when the sun is positioned below the horizon. The microclimate model 300 is further improved in being able to calculate the effects of vegetation on the temperature and wind profiles, and the effects of slope on the temperature, as well as enabling a user to select the heights and depths above and below ground at which the microclimates are characterized.

The basic model calculates certain key climate variables from basic principles. The basic model is a one-dimensional finite difference model that uses data from the set of environmental conditions data 120 (including air temperature and wind speeds at certain heights, average annual temperature to specify deep soil temperature, soil properties, humidity at a known height, measurements of solar radiation, and geographic coordinates) to simultaneously solve the heat and mass balance equations for the ground surface and below (solving the equation numerically with an Adams Predictor-Corrector algorithm), and thereby the above- and below-ground microclimates, over specified time intervals (e.g., hourly simulations for the average day for each month of the year for any locality). The basic model also computes wind speed and temperature profiles from the ground surface (for flat surfaces only) to a two meter reference height (i.e. the height where meteorological data are typically measured). Clear sky solar radiation (when the sun is above the horizon) is measured and these values input to the basic model.

Certain of the basic model calculations were disclosed in prior publications. Air temperature and wind speed profile, soil temperature, and soil surface and below boundary conditions calculations, are set forth in Porter et al. [1973. *Behavioral implications of mechanistic ecology: thermal and behavioral modeling of desert ectotherms and their microenvironment*. Oecologia 13:1–54. Wind velocity calculation set forth at equation (2) on p.4; air temperature calculation set forth at equation (3) on p. 5; soil temperature calculation set forth at equation (4) on p. 5; soil surface and below boundary conditions are set forth at equations (5) to (11) on p. 6], the disclosure of which is incorporated herein by reference. Available solar radiation calculations when the sun is positioned above the horizon are described in McCullough and Porter [1971. *Computing clear day solar radiation spectra for the terrestrial ecological environment*. Ecology 52(6):1008–1015. Solar radiation is calculated according to the flow chart (FIG. 2) on p. 1013, which refers to the methodology and the various equations used in the calculations employed], the disclosure of which is incorporated herein by reference.

The basic model uses these data, together with information particular to the animal species selected (i.e. average height above ground and its preferred temperature range; both of which are specified in the set of animal characteristics data 190), to calculate the climate boundary conditions for an average individual of the species (including solar radiation, IR fluxes from the sky and ground, air temperature, wind speed, and relative humidity of the air passing over the animal) and the percentage of habitat thermally available to it. The percentage of thermally available habitat is the percentage that allows the animal to stay within its preferred temperature range, thereby avoiding significant thermoregulatory heat stress costs.

As mentioned above, the microclimate model 300 of the present invention provides an improved version of the basic model including: (1) the incorporation of a solar radiation model; (2) the ability to calculate the effects of vegetation and slope on temperature and wind profiles; (3) the ability to calculate the effects of topography on air temperature profiles over elevation; and, (4) the ability for a user to specify the heights and depths above and below ground at which the microclimates are characterized.

i. The Solar Radiation Model

The microclimate model 300 improves upon the basic model in that it incorporates therein a solar radiation model to calculate the amount of solar radiation incident on the ground. The solar radiation model of the present invention calculates the amount of solar radiation absorbed per unit area of ground, duration of solar radiation on the ground, and spectral quality, if needed. The basic model, by contrast, takes input on solar radiation measured and/or calculated elsewhere.

Data used by the solar radiation model are provided by a database of solar radiation defined by spectral bandwidth energies available above the earth's atmosphere. Current Julian date is used to compute earth-sun distance to adjust solar energy per unit area. Solar radiation at the earth's surface is calculated by the extinction properties of the atmosphere, depth of the atmosphere and geographic coordinates of a locality at a given time. This eliminates the need for direct measurements at a site.

The solar radiation model is also improved in that it accounts for the effects of slope on solar radiation reaching the ground, whereas the former solar radiation calculations assumed flat ground surfaces only. The effects of slope on the amount of solar radiation reaching a surface may be significant. Accounting for those effects increases the model's accuracy in solar radiation calculations, and thereby also calculations based upon them, such as ground and air temperatures.

A further improvement of the solar radiation model is that it is now able to calculate the amount of solar radiation when the sun is below the horizon, enabling more accurate calculations for the amount of solar radiation present when crepuscular animals are active at dusk and dawn.

The solar radiation model and its various improvements are incorporated into the microclimate model 300 as follows.

Solar radiation dataset. Solar radiation data used by the solar radiation model component of the microclimate model 300, are calculated using a database of solar radiation spectral bandwidth energies available above the earth's atmosphere (F. S. Johnson (private communication to inventor, in Ch.1, p.2 of Robinson, N. 1966. Solar Radiation. Elsevier Publ. Co., New York. 347p.). Current Julian date is used to compute earth-sun distance to adjust solar energy per unit area on top of the atmosphere. Solar radiation at the earth's surface is calculated from the extinction properties of the atmosphere (see, McCullough and Porter, 1971, ref. above), depth of the atmosphere and geographic coordinates of a locality and time. Measurements of solar radiation taken at the actual location are no longer required, although they may be used for verification purposes. The database of spectral bandwidth dependent atmospheric extinction coefficients and solar radiation spectral bandwidth energies is contained in a data file, Solar.dat (not shown).

Effect of slope on solar radiation. The solar radiation model further improves the basic model by incorporating the effects of slope on the amount of solar radiation reaching the ground. The effects of slope are calculated by equations based on work by Hosmer, G. L. (1910. Practical Astronomy. Wiley & Sons. New York, or Hosmer, G. L. and J. M. Robbins. 1948. Practical Astronomy. Wiley & Sons. 355 pp.). The summary equation is presented in W. D. Sellers (1965. Physical Climatology, University of Chicago Press, 272 pp. Equation No. 3.15 on p. 35), the disclosure of which is incorporated herein by reference).

Below horizon solar radiation. The solar radiation model enables the calculation of the amount of solar radiation when the sun is below the horizon, as at dusk and dawn. Prior to this the basic model assumed that the sun was full sun and located above the horizon. Values for below horizon solar radiation enable more accurate measures for the amount of solar radiation in the microclimatic environments of crepuscular animals.

The solar radiation model of the present invention calculates the amount of solar radiation when the sun is below the horizon by first computing the amount of skylight (see, G. V. Rosenberg, 1966. *Twilight*. Plenum Press, pp. 18–19). First, the total lumens are calculated from a regression of data from "Twilight" (which is Elog=41.34615384−0.423076923*Zenith angle). The sky luminosity is equal to 10**Elog. Lumens/m2 are then converted to W/m2 (see, Documenta Geigy Scientific Tables. 1966. 6th edition. K. Diem, ed., p. 239), by multiplying by the mechanical/electrical equivalent of light (i.e., $1.46*10^{-3}$ kW per lumen).

ii. Effects of Vegetation on Microclimate

Vegetation-climate interactions can impact directly and indirectly animal food and water requirements, growth and reproduction potential, activity patterns, population dynamics, and structure of food webs. For example, loss of vegetation in cold climates can be particularly challenging for large animals that depend on intact evergreen vegetation for radiant protection during the cold winter nights that they must endure. The effects of vegetation on an animal's microclimate are calculated by the microclimate model 300 of the present invention.

The microclimate model 300 calculates the effects of vegetation on the temperature and wind profiles from the ground level to a 2 m reference height, including at the animal's average height above ground.

Under dense vegetation, the overhead sky radiant temperature (Tsky) is assumed to be equal to the local 2 m air temperature (Tair,2m). The leaves or needles of trees and/or bushes may provide radiant insulation because they generally have high heat transfer coefficients, which causes them to be convectively warmed at night or cooled during the daytime. Multiple layers of vegetation above 2 m may provide further radiant insulation.

Modification of wind velocity profiles by vegetation may be measured empirically. In the absence of such information, the "bushel basket" formula can be used to estimate velocity profiles between objects of known dimensions and distances (C. R. Stearns. 1967. Micrometeorological studies on the coastal desert of Peru. Ph.D. thesis, University of Wisconsin, Madison, Wis.).

Whether temperatures between the 2 meter height (Tair, 2m) and ground surface (Tgrd) vary, depends upon the amount of sunlight striking the ground. One extreme is complete shade, which results in no temperature differences between ground and two meters. The other extreme is no shade, which results in a typical logarithmic air temperature profile. Changes in the percent of ground shade alter ground surface temperature, which in turn, alters the temperature profile between the surface and 2 m shade temperature. Though vegetation is assumed to alter wind velocity profiles, temperature profiles are currently assumed to be unaffected by vegetation, except for the degree of ground shade specified by the user.

iii. Effects of Slope on Microclimate

The amount of solar radiation reaching the ground surface depends on the slope of the ground. Hence an improvement over the prior basic model, is the incorporation of slope into the present microclimate model 300 to improve the accuracy of solar radiation calculations. This is done by equations based on work by G. L. Hosmer (the summary equation is No. 3.15 on p. 35 of *Physical Climatology* by W. D. Sellers. 1965. of Chicago press. 272 pp., and is incorporated herein by reference).

iv. Effects of Topography on Microclimate

Topography can affect air temperature profiles over elevation. The present microclimate model 300 is able to calculate those effects by using adiabatic principles to adjust temperatures based on elevation differences from temperatures at a known height. There are various corrections used from 9.9 degrees C. per kilometer in non-mountainous regions, to 5.5 degrees C. per kilometer in mountainous regions. The equation using meters and degrees C. is:

current temperature=reference temperature at reference elevation+0.0055*(reference elevation−current elevation).

v. User-specifiable Heights and Depths

The microclimate model 300 has also been improved to allow a user to specify the heights and depths above and below ground at which the microclimates are characterized. The user is thus able to customize the microclimate outputs to increase the accuracy for a particular species, to enable a broader array of scenarios to be posed in order to better manage an animal population, or to achieve any number of other goals. From a knowledge of the animal morphology, the user specifies the animal's average height above ground. The animal height is then used by the program to compute the wind speed and temperature for profiles that the user has specified, by selection of a reference height for the null calculations for an animal at each locality.

vi. Microclimate Model Conditions Output 400

The microclimate model conditions output 400 includes the solutions to the heat and mass balance equations for the ground surface and below, the climate boundary conditions experienced by an individual of the animal species selected, and the percentage of habitat thermally available to it.

Figure 3A:
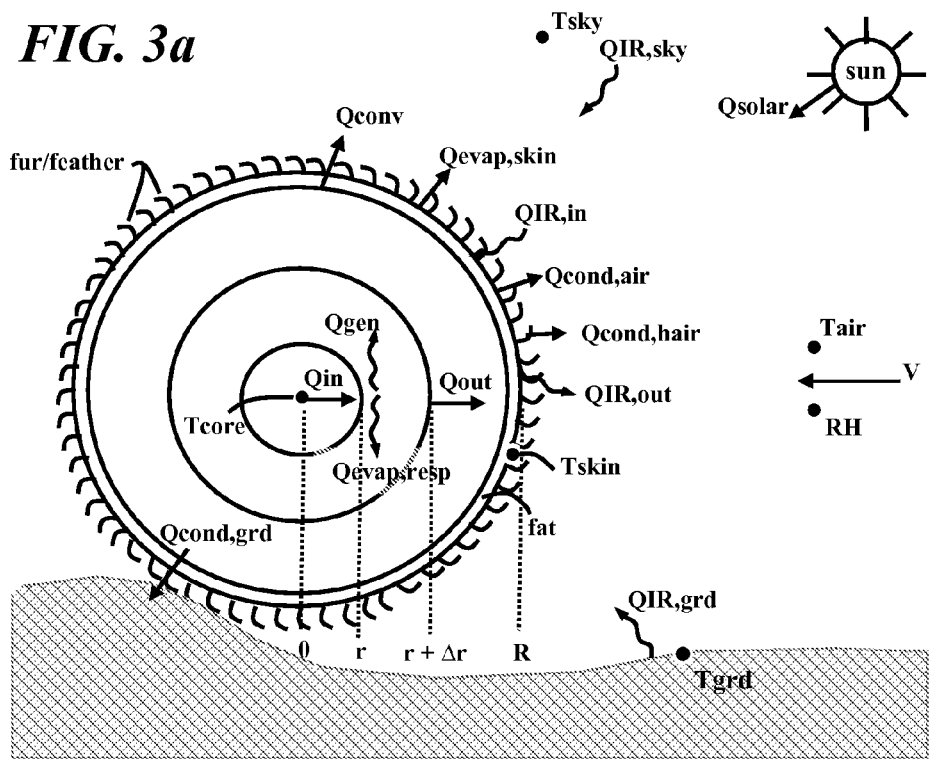
FIG. 3a, is a diagram of a cross-section of an animal with porous insulation and heat fluxes including uniform heat generation per unit volume and uniform heat dissipation by respiration per unit volume.

Many of the climate boundary conditions calculated by the microclimate model 300 are illustrated in FIG. 3*a*, a diagram of a cross-section of an animal with porous insulation and heat fluxes including uniform heat generation and uniform heat dissipation by respiration. They include the clear sky solar radiation (Qsolar), IR fluxes from the sky (QIR,sky) and ground (QIR,grd), air temperature at the average height of the animal (Tair), ground temperature (Tgrd), and the wind speed (V) and relative humidity (RH) of air passing over the animal at its average height above ground.

The percentage of habitat thermally available to the animal is also calculated based on the climate boundary conditions and the specified preferred temperature range of the animal.

c. Animal Model 500

The animal model 500 of the present invention uses the microclimate conditions output 400 and data included in the set of animal characteristics 170, to calculate an animal conditions output 600 (see, W. P. Porter et al. 2000. *Calculating climate effects on birds and mammals: impacts on biodiversity, conservation, population parameters, and global community structure*. Amer. Zool. 40:597–630). In general, the output 600 includes the values for several energetic variables including total discretionary energy and water, the temperature-dependent activity of the animal and the total annual activity time of the animal. Using the values for these energetic variables, spatial analyses and further calculations 800 may be performed to analyze spatial variation and to solve for a variety of population and community level variables such as survivorship, growth and reproduction.

In overview, the animal model 500 calculates the aforementioned energetic variables by performing coupled analyses of heat and mass balance and by calculating the total annual activity time of the animal. Different subroutines of the animal model 500 are employed to perform various aspects of the heat and mass balance analyses and to track activity time of the animal. The subroutines include a porous media model for insulation, an optional appendage model, coupled models of the gut and lungs, and a thermoregulatory model.

Many of the subroutines are run in parallel and/or iteratively to solve for the various values that drive the final solutions. Together they enable the animal model 500 to accurately calculate the amounts of discretionary energy (Qdiscr) and water (Mw,discr) from first principles (i.e., rather than regression analyses), thus enabling the accurate calculation of growth and reproduction under any kind of environmental circumstance, and under any kind of animal property.

Figure 2:
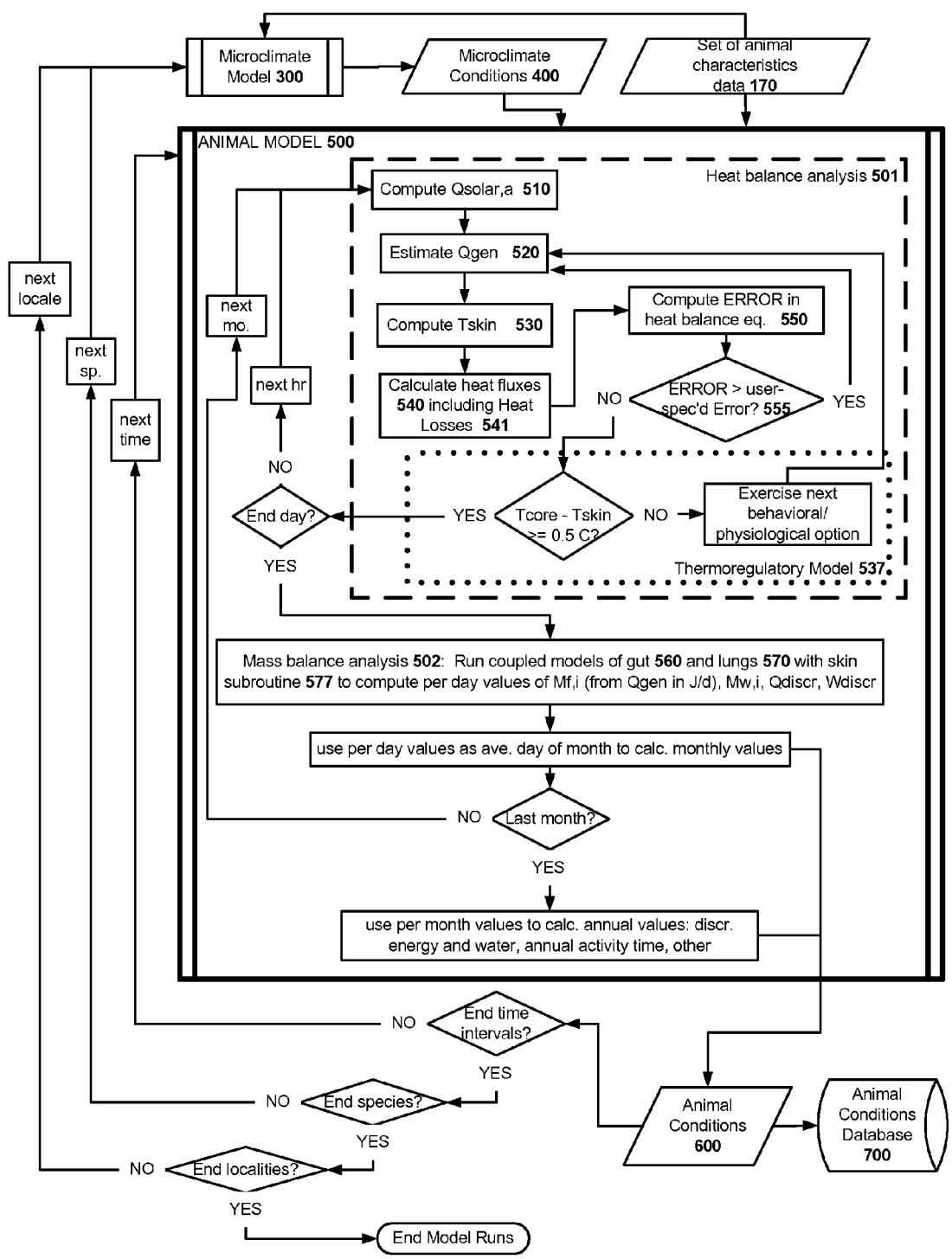
FIG. 2, is a summary of the general method for the animal model.

Referring to FIG. 2, the animal model 500 portion of FIG. 1 is expanded into a flow chart summary of its basic processes. The following description explains how the various sub-models and other calculations performed by the animal model 500, contribute to each of the steps indicated in FIG. 2.

Figure 3B:
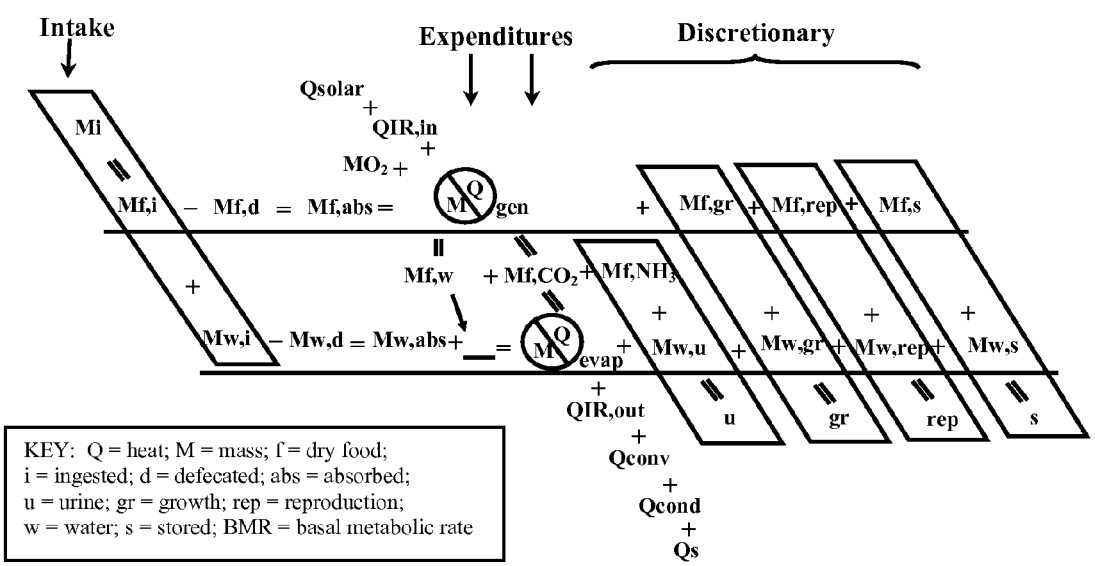
FIG. 3b, is an illustration of the coupled heat and mass transfer equations and how the models may be used to calculate the energetic consequences of climate-disease-toxicant interactions and to assess energetic constraints on community structure.

The heat and mass balance analyses performed by the animal model 500 represent the coupled mechanisms of heat and mass transfer. Referring to FIG. 3b, coupled heat and mass transfer equations are represented that illustrate how they are used to quantitatively evaluate energetic consequences of environmental interactions (e.g., with climate, disease, toxicants and the like), and to assess energetic constraints on community structure.

The equations shown in FIG. 3b share common terms in the heat and mass transfer equations for metabolism and evaporation. The equations emphasize that the discretionary mass (Mdiscr) available for growth (Mgr), reproduction (Mrep), and fat storage (Ms), depends upon (1) environmental conditions that affect heat fluxes in the diagonal heat balance equation, (2) mass ingested and absorbed which determines the amount of dry matter and water ingested and absorbed, and (3) metabolic rates and evaporative water losses. Metabolic rates and evaporative water losses are affected by an animal's physiology (e.g.., body temperature maintained) and behavior (e.g., microclimates selected, activity levels, locomotor costs to obtain food with distribution that changes, appetite levels and the like).

Heat and mass transfer may occur through the flesh, fat and porous insulation layer (i.e., fur or feather) of animals. Referring to FIG. 3a, a diagram of a cross-section of an animal with a porous insulation layer and heat fluxes including uniform heat generation (Qgen) and uniform heat dissipation by respiration (Qresp;) is depicted [W. P. Porter et al., 2000. (ref. above), FIG. 2 on p. 602]. The cross-section could represent a torso whose geometry may be approximated by a cylinder, sphere, or ellipsoid, or even a cross section through an appendage, if the heat loss by respiration is removed (see appendage model below). There may or may not be porous insulation beyond the skin.

FIG. 3a depicts the information needed for the heat and mass balance analyses performed by the animal model 500. Data needed are provided in the set of animal characteristics data 170 [including, mean length of the fibers (hair or hair-like elements in feathers); fiber density as a function of depth, fiber diameter, the depth of the insulation, and, if the animal is diurnal and exposed to sunlight, solar reflectivity and transmissivity of the fibers]. Also needed are data from the microclimate conditions 400 that specify the climate boundary conditions for an individual [solar radiation (Qsolar), IR fluxes from the sky (QIR,sky) and ground (QIR,grd), air temperature at the animal's average height (Tair), ground or other surface temperature (Tgrd), and the wind speed (V) and relative humidity (RH) of air passing over the animal at its average height above ground]. The climate boundary conditions are calculated by the microclimate model 300 based on the animal's average height above ground and the microclimate calculations for environmental conditions above ground (see section on microclimate model 300 above).

i. Performing the Heat Balance Analysis 501

Performing the heat balance analysis 501 comprises running a porous insulation model to simultaneously calculate the amount of heat entering the animal from external sources (Qin), and the amount of heat leaving the animal to the environment (Qout), contingent on the current guess for the metabolic heat generation needed to maintain the animal's core temperature (Qgen). Simultaneous calculations are required because in porous media, diffuse radiation fluxes and conduction interact with each other to affect the insulation temperature profile from skin to insulation-air interface. If the core-skin temperature gradient is too small, then a thermoregulatory model 537 is invoked until a stable solution is found that will allow a core-skin temperature gradient of at least 0.5 degrees C. to exist.

1. Calculating the Amount of Solar Radiation Absorbed by the Animal (Qsolar,a) 510.

Computing the amount of solar energy absorbed (Qsolar, a), is accomplished as follows.

Direct beam solar radiation (Qsolar,dir):

$$Qsolar,dir=ABSAN*ASILN*(1.00-PCTDIF)*Qnorm*(100-ashade)/100$$

where,

ABSAN is animal absorptivity,

ASILN is silhouette area normal to the sun,

PCTDIF is percent diffuse solar radiation,

Qnorm is total solar radiation incident on a surface normal to the sun's direct beam, and ashade is percent shade on the animal.

Diffuse components (sky and substrate) of solar radiation are then calculated as follows:

$$QSOBJ=ABSAN*Fabush*Area*PCTDIF*Qsolar,hor*(100.-ashade)/100$$

$$QSSKY=ABSAN*Fa,sky*Area*PCTDIF*Qsolar,hor*(100.-ashade)/100.$$

$$QSRSB=ABSAN*Fa,grd*Area*(1.0-ABSSB)*Qsolar,hor*(100.-ashade)/100.$$

$$QSDIFF=QSSKY+QSRSB+QSOBJ$$

where,

QSOBJ is incoming diffuse radiation reflected by an object nearby,

Fabush is the configuration factor between the animal and the nearby object,

Qsolar,hor is the incoming solar radiation on a horizontal surface,

QSSKY is the diffuse solar radiation from the sky (i.e. solar radiation scattered by molecules in the atmosphere and by clouds), Fa,sky is the configuration factor between the animal and the skyQSRSB is the incoming solar radiation reflected from the substrate (i.e. ground or other surface), Fa,grd is the configuration factor between the animal and the ground, ABSSB is the absorptivity of the substrate, and QSDIFF is the total amount of diffuse solar radiation.

Total solar energy absorbed (Qsolar,a) is then calculated as the sum of energy absorbed on the top (i.e. dorsal; Qdorsl) and bottom (i.e. ventral; Qventr) parts of animal 510.

$$Qdorsl=(QSDIR+QSOBJ+QSSKY)$$

$$Qventr=QSRSB$$

$$Qsolar,a=Qdorsl+Qventr$$

2. Estimating the Metabolic Heat Generation Needed to Maintain the Animal's Core Temperature (Qgen) 520 and Computing the Temperature of the Skin (Tskin) 530.

An estimate for the metabolic heat generation needed to maintain the animal's core temperature (Qgen) is made 520. Before calling the iterative guessing routine, Zbrent, the iterative guessing routine two bounding guesses are needed to start the process. This is done by first guessing for total metabolic rate (W) using the standard regression value in the literature for an animal at 28 C. air and radiant temperature, humidity approximately 5%, and low wind speed, approximately 0.1 m/s. Humidity and wind speed were never reported for the experiments. MASS is in kg. The regression units are not J/s, so conversion is required.

$$Qgen=X1=(70.*MASS**0.75)*(4.185/(24.*3.6))$$

A second guess is created by arbitrarily adding 5 to the value of X1 just calculated. A stability check is done on the value of X1 to make sure it does not equal zero. Then a bracketing subroutine, ZBRAC, (Press, W. H., Flannery, B. P., Teukolsky, S. A., and Vetterling, W. T. 1987. Numerical Recipes. The Art of Scientific Computing. Cambridge University Press, Cambridge ) is called.

$$CALL\ ZBRAC(FUN,X1,X2,SUCCES)$$

FUN is the name of the function containing the energy balance equation, X1 and X2 are two starting guesses, SUCCES returns a value indicating success of the process. A criteria for success, TOL, in balancing the energy balance equation must be specified. Ideally TOL equals zero if heat fluxes in and generated in exactly equals heat fluxes out.

In the program $TOL=0.01*mass$

Then a solution is sought by invoking the energy balance equation via ZBRENT (Press et al., ibid.) and FUN.

$$Qgen=ZBRENT(FUN,X1,X2,TOL)$$

Inside FUN the estimated value for Qgen is then equated to the value for the heat generation per unit volume (g), $$g=Qgen/VOL$$

Respiratory water loss as a function of oxygen consumption is then done based on the heat generation requirement. No negative metabolic rates are allowed.

If (Qgen .gt. 0.000) then
CALL RESP
else (Negative metabolic rate. No physiological meaning-set dummy values this guess)
Qresp=0.00000
Qgen=−10.00000
endif Net internal heat generation is calculated as $$Qgenet=Qgen-Qresp$$

Net internal heat generation/unit volume is then calculated.

$$Gn=Qgenet/Vol$$

This is used for estimating skin temperature as in Eq. (53) (Porter et al., 1994, at p. 162, herein incorporated by reference):

$$Gn=g=[(n\ K)/R^2]*(Tcore-Tskin)$$

where,
n is the geometry constant (varies with shape),
K is the thermal conductivity for tissue,
R is the radius of the animal,
Tcore is the core temperature of the animal, and
Tskin is the skin temperature of the animal.

Rearranging the equation, the Tskin is solved for 530. The value for Tskin is then used in subsequent calculations.

3. Computing Heat Fluxes between the Animal and its Environment 540.

The heat fluxes occurring between the animal and its environment are calculated by solving for the amount of heat exchange across the insulation of the animal using a porous insulation model to compute both the amount of heat entering the animal and the heat losses 541 from the animal. An appendage model is also employed in the case of large birds and mammals to further incorporate heat fluxes across an animal's appendages.

a.) The Porous Insulation Model.

The porous insulation model of the present invention is run to calculate the amount of heat exchange across the insulation of the animal (Qin−Qout). For birds and mammals greater than 100 kg in size, an appendage model (see below) is also employed to more accurately calculate the heat exchange over appendage surface areas.

Unlike the prior version of the porous insulation model [W. P. Porter et al., 1994. *Endotherm energetics: from a scalable individual-based model to ecological applications*. Aust. J. Zool. 42:125–62, Appendix equations (24) to (53) on pp. 159–162 and description of the model and methods on pp. 127–137, the disclosure of which is incorporated herein by reference], the porous insulation model of the present invention incorporates a solar radiation calculation to broaden its applicability to daylight conditions. In this way, the porous insulation model enables a user to calculate the amount of Qin including both when the animal is exposed to sunlight and when the animal is in the dark.

Solar radiation (Qsolar) is incorporated into the porous insulation model by assuming that solar radiation is absorbed very close to the fur/feather-air interface, which is usually the case for bird feathers and dark, dense fur. Absorbed solar radiation (Qsolar,a) heats the fiber elements, which then emit infrared radiation outward (QIR,out) toward the sky and inward (QIR,in) through the porous insulation. The watts of absorbed solar radiation (Qsolar,a) are treated as an additional source of thermal radiation from the sky for the half of the animal exposed to the sky. Thus, the diffuse IR equations already in the prior model were also used for incorporating absorbed solar radiation in the model of the present invention. To do this, an additional term for absorbed solar radiation was added to equation (52) of the original model (Porter et al., 1994, eq. (52) at p. 162).

Computing IR fluxes in. The Swinbank formula is applied to solve for the clear sky temperature (Tsky) in degrees Kelvin, based on the air temperature at 2 m in height (Tair,2m) in degrees centigrade.

$$Tsky=0.0552*(Tair,2m+273.)**(1.5-273.)$$

IR fluxes from other objects overhead of the animal (i.e. vegetation) that are 'substituting' for sky, are also calculated. The temperature of vegetation (Tveg) is set to the Tair,2m to solve for the IR fluxes from sky (QIR,sky) and vegetation (QIR,veg):

$$Tveg=Tair,2m$$

$$QIR,sky=C3*(Tsky+273.15)**4$$

$$QIR,veg=C6*(Tveg+273.15)**4$$

Next, the porous media model checks for whether fur or feathers are optically thick or not. If optically transparent [i.e. no effective fur or feathers or no insulation present (as is the case for many ectotherms)], it is assumed that no solar radiation is absorbed by the fur or feathers. If, on the other hand, the fur or feathers are optically thick, solar radiation is treated as though it is absorbed close to the fur-air interface and is treated as an IR source.

IF(B1ARA(1) .lt. 0.001), then fur/feathers optically transparent (no effective fur) and, $$QIR,above=QIR,sky+QIR,veg$$

$$QIR,below=sig*(Tgrd(i)+273.15)**4$$

where,
B1ARA(1) is a variable that indicates the optical thickness of the fur or feathers; it is the exponent of Beer's Law (i.e. the extinction coefficient ($\tau$)times the depth of fur/feathers (t)),
QIR,above is the IR fluxes from above the animal,
QIR,below is the IR fluxes from below the animal,
sig is the Stefan-Boltzmann constant, and
Tgrd(i) is the ground temperature at location (i).

Else, optically thick, fur present and solar radiation absorbed, qdorsl from above and qventr (solar reflected from the ground) is treated as diffuse radiation absorbed by the fur, $$QIR,above=QIR,sky+QIR,veg+qdorsl$$

$$Tsky=(QIR,sky/(C3+C6))**0.25-273.15$$

$$QIR,below=sig*(Tgrd+273.15)**4+qventr$$

$$Tgrd=(QIR,grd/sig)**0.25-273.15$$

Whichever the case, the amount of radiant heat entering the animal from external sources (QIR,in) is:

$$QIR,in=QIR,above+QIR,below$$

as illustrated in FIG. 3a.

Computing heat losses via conduction, convection, evaporation and IR flux. 541. Equation (52) of the original model (Porter et al., 1994. eq. (52) at p. 162, see PP. 156–169 for explanation of variables) is:

$$C1=-[4\sigma((Tskin+Tsky)/2)^3(Tskin-Tsky)(1-2E_3(\beta_T Z_L))+h_c(Tskin-Tair)+2\sigma(T^4skin-T^4sky)E_3(\beta_T Z_L)]/[(k_{eff}+k_r)+(h_c+2\sigma((Tskin+Tsky)/2)^3(1-2E_3(\beta_T Z_L)))Z_L]$$

In the new version (Porter et. al., 2000), the equation has been modified so that the sky, the ground, and nearby objects (bush, boulder, etc.) are treated separately and then combined. The equations have been normalized for more compact form.

The sky portion of radiant heat exchange (TAVsky), is, $$TAVsky=((Tsky+Tskin)/2.)+273.15$$

$$KRADSKY=(16.0*sig*TAVsky**3.)/(3.*BETARA(2))$$

$$HR=Fa,sky*4.*EMIS*sig*(Tsky+273.15)**3$$

$$BIR=HR*ZFURAR(2)/(KEFARA(2)+KRADSKY)$$

$$BICV=HC*ZFURAR(2)/(KEFARA(2)+KRADSKY)$$

$$D1=1.+BICV+2.*BIR*(0.5-(0.333-E4B1/B1ARA(2)))$$

$$C1N=(BICV*(1.-TKair/TKskin)+BIR*(1.-Tksky/TKskin))$$

$$C1dors=C1N/D1$$

$$PSI=0.854+(ALOG10(BICV)*0.149)$$

$$QRADSK=PSI*Areaskin*Fa,sky*KRADSKY*(C1dors*TKskin/ZFURAR(2))$$

where,
TAVsky is the average temperature on the dorsal half of the animal (degrees K),
KRADSKY is the fur/feather radiant conductivity in the sky direction,
BETARA(2) is the IR extinction coefficient of fur/feathers,
HR is the radiant heat transfer coefficient,
EMIS is the emissivity of the animal,
BIR is a dimensionless variable for IR heat transfer,
BICV is a dimensionless variable for convection heat transfer,
ZFURAR is the depth of fur,
KEFAR is the effective thermal conductivity of fibers and air for conduction,
HC is the convection heat transfer coefficient,
D1 is dimensionless,
C1N (C1 normalized) is dimensionless,
PSI is a correction factor,
TKair, TKskin, TKsky are the temperatures of air, skin, sky in degrees K,
QRADSK is the incoming solar IR radiation from the sky through the porous media,
Tskin is the skin temperature of the animal, and
Subscript notation: (1)=overall, (2)=dorsal, (3)=ventral fur The following calculations continue in the same way as those above, but for a bush or nearby large object portion of radiant heat exchange, instead of for sky (definitions above are easily substituted for variables below with respect to bush instead of sky and will not be defined separately):

$$TAVbsh=((Tbush+Tskin)/2.)+273.15$$

$$KRADBUSH=(16.0*SBK*TAVbsh**3.)/(3.*BETARA(2))$$

$$HR=Fabush*4.*EMIS*SBK*(Tbush+273.15)**3$$

$$BIR=HR*ZFURAR(2)/(KEFARA(2)+KRADBUSH)$$

$$BICV=HC*ZFURAR(2)/(KEFARA(2)+KRADBUSH)$$

$$D1=1.+BICV+2.*BIR*(0.5-(0.333-E4B1/B1ARA(2)))$$

$$C1N=(BICV*(1.-TKair/TKskin)+BIR*(1.-Tkbush/TKskin))$$

$$C1bush=C1N/D1$$

$$PSI=0.854+(ALOG10(BICV)*0.149)$$

$$QRADBU=PSI*Areaskin*Fabush*KRADBUSH*(C1bush*Tkskin/ZFURAR(2))$$

The ground portion of radiant heat exchange (ventral part of animal), $$TAVgrd=((TGRD+Tskin)/2.)+273.15$$

$$ktop=16.0*SBK*TAVgrd**3.$$

$$kbottom=3.*BETARA(3)$$

$$KRADGRD=ktop/kbottom$$

$$HR=Fa,grd*4.*EMIS*SBK*(((T2+Tskin)/2.)+273.15)**3$$

$$BIR=HR*ZFURAR(3)/(KEFARA(3)+KRAD)$$

$$BICV=HC*ZFURAR(3)/(KEFARA(3)+KRAD)$$

$$D1=1.+BICV+2.*BIR*(0.5-(0.333-E4B1/B1ARA(3)))$$

$$C1N=(BICV*(1.-TKair/TKskin)+BIR*(1.-TKgrd/TKskin))$$

$$C1vent=C1N/D1$$

$$PSI=0.854+(ALOG10(BICV)*0.149)$$

$$QRADGR=PSI*Areaskin*Fa,grd*KRADGRD*(C1vent*Tkskin/ZFURAR(3))$$

The net radiant heat exchange (QRAD) is then the net radiant fluxes between the animal and the sky, ground and bushes (or other objects), i.e. QRAD=QIR,in−QIR,out (in FIG. 3a).

$$QRAD=QRADSK+QRADGR+QRADBU$$

Conduction not lost by outward radiation from hairs within the fur equals convection at fur-air interface (Qconv).

Dorsal conduction (QcondD) (via air (Qcond,air) and fur/feathers(Qcond,hair)):

$$QcondD=PSI*(Areaskin/2.)*KEFARA(2)*(C1dors*TKskin/ZFURAR(2))$$

Ventral conduction (QcondV) (via air (Qcond,air) and fur/feathers(Qcond,hair)):

$$QcondV=PSI*(Areaskin/2.)*KEFARA(3)*(C1vent*TKskin/ZFURAR(3))$$

Total heat loss by conduction (Qcond) is then:

$$Qcond=QcondD+QcondV$$

$$C1=(C1dors+C1vent)/2.$$

The fur energy flux (Qfur) is the total heat loss from the skin and fur.

$$Qfur=Qcond+QIR,out+Qevap,skin+Qconv$$

The whole animal energy balance at the skin is then, $$Qnet=Qin+Qgen-Qout$$

where,
Qnet is the net heat exchange of the whole animal;
Qin is the total energy entering the animal=Qsolar,a+QIR, in;
Qgen is the metabolic heat generation needed to maintain the animal's core temperature (estimated earlier in the process); and,
Qout is the total energy leaving the animal=Qfur+Qevap, resp (where Qevap,resp is calculated below by the lung model as part of the mass balance analysis).

Computing the ERROR by solving the heat balance equation 550. Assuming that the value of Qnet will approach 0 when the value of Qgen is accurate, the ERROR is substituted for Qnet in the equation and solved for as follows, $$ERROR=Qin+Qgen-Qout$$

The actual value of ERROR is then compared to the user-specified maximum acceptable value for Error, TOL, 555. If the actual ERROR is greater than the specified value, a new estimate for Qgen is generated 520 and a new value for Tskin is calculated 530 for subsequent use in the following computations of heat losses 540.

If the ERROR is less than or equal to the specified maximum value, the value of Qgen is deemed to be accurate, and the value for Tskin previously calculated on its basis 530 is also deemed accurate. In that case, the thermoregulatory model 537 is actuated (see below) and a calculation of the core-skin temperature gradient (Tcore−Tskin) is made and compared to a user-specified value (for example, 0.5 degrees C.).

If the core-skin gradient is less than 0.5 C., the animal must respond behaviorally or physiologically to enable proper cooling. In this case, the thermoregulatory model 537 invokes the behavioral and physiological options in a predetermined order. After an option is chosen, the animal model 500 proceeds to estimate the Qgen 520 and proceed through the aforementioned steps until evaluating the core-skin temperature gradient again. If the gradient is still not satisfied, the next option is set and calculations repeated until the minimum core-skin gradient is satisfied.

When the core-skin temperature gradient is satisfied, (i.e., it is greater than or equal to 0.5 C.), the animal is assumed to be able to cool itself properly. The animal model 500 then proceeds to begin another round of calculation over every other hour of a day to calculate an average day of each month, then over every month to eventually calculate annual values for the various energetic variables.

b.) The Appendage Model.

An appendage model was also added to the animal model 500 to more accurately calculate the amount of heat entering and lost from the animal via its appendages when the model is applied to large birds (such as, for example, the rhea, the cassowary, and the ostrich) and to mammals of a size greater than or equal to 100 kg. As applied to those sorts of animals, the appendages are large and may constitute a significant percentage of the surface area of the standing animal over which heat may be gained or lost. The geometries used to model a large standing bird (cylinders and ellipsoid) compared to a sitting bird (ellipsoid) vary accordingly. But without porous insulation and respiratory water loss, the appendage model is used to calculate heat loss in the radial dimension from the appendages of an animal.

c.) The Thermoregulatory Model 537.

The thermoregulatory model yields modified microclimate/physiology conditions that allow for a stable solution for body temperature when there is heat stress (i.e., when the core-skin temperature gradient (Tcore−Tskin) is less than 0.5 degrees C., as discussed above). The thermoregulatory model 537 solves for the behavioral and/or physiological changes needed to maintain the animal's core temperature in heat stress conditions.

Options in a behavioral and physiological options hierarchy are chosen sequentially. Initially, the animal model 500 begins by assuming the animal is in a "null" condition. The "null" condition is user-specified and represents a circumstance where the animal is exposed to the sun and sky as much as possible given user specified constraints (e.g., regarding whether the animal is diurnal, nocturnal or crepuscular; whether it is arboreal or fossorial; the percent shade available and degree of cloud cover in the animal's environment; and the like).

If the core/skin gradient is not greater than or equal to the specified minimum (e.g., 0.5 degrees C.), then the thermoregulatory model's 537 options hierarchy is invoked. In the first level, the animal may proceed to modify its behavior by, for example, seeking shade on the ground, climbing to cooler temperatures in the shade, retreating below ground, or acting otherwise depending on the user specified behavioral options. Option-dependent values for variables are set and the animal model 500 proceeds to begin again to estimate Qgen 520 and following (as described above, see FIG. 2) until the core-skin gradient is once again evaluated. If the chosen option is insufficient to maintain at least the minimum core-skin gradient, then the next behavioral option is exercised, and so on through the behavioral options until the minimum core/skin temperature gradient is satisfied.

If the behavioral options fail to satisfy the minimum core-skin temperature gradient, then the animal is allowed to exercise physiological options and the model iterations repeated as with the behavioral options. The user may specify that the animal first allow its core temperature to rise before invoking evaporative heat loss, or alternatively, the user can specify that the animal invoke evaporative heat loss first and, failing that, allow its core temperature to rise. A core temperature increase will always allow for a stable solution and may be exercised as a last option.

Many different and varied combinations of behavioral and physiological options are possible and specifiable by the user. Each will generate its own set of energetic costs that will subsequently feed into the animal model's 500 calculation of the amount of discretionary energy and water. The thermoregulatory model's 537 evaluation of the behavioral and physiological options available to an animal may yield significant insights into how best to manage the environment of an animal for minimal stress, optimal activity time and other related effects.

ii. Performing the Mass Balance Analysis 502

The mass balance analysis of the present invention solves for the amount of discretionary mass from food (Mf,discr) [given the amount of food needed to meet the metabolic heat generation required to maintain the animal's core temperature (Qgen)], the amount of discretionary mass from water (Mw,discr), and the amount of discretionary energy (Qdiscr) available to the animal.

The mass balance equations of the animal model 500 generally solve for the total discretionary mass from food and water (Mdiscr) by calculating the mass of food and water absorbed by the animal (Mf,a, Mw,a) [equaling the mass of food and water intake by the animal (Mf,i, Mw,i) minus the mass of food and water loss by excretion and evaporation (Mf,d, Mw,u, Mw,evap)], and the mass of food and water metabolized by the animal (Mf,met, Mw, met). To do this, the animal model 500 employs molar balance models for the lungs 570 and gut 560 to allow for the coupling of food ingested and/or absorbed to respiratory gas exchanges and evaporative water loss from the respiratory system.

One of the improvements in the animal model 500 is the addition of the distributed respiratory water loss, which represents lungs that span most of the body cavity. This innovation gives much better agreement of predicted metabolic rates with measured values. A skin subroutine is also used to calculate evaporative water loss from skin (Mw, evap,skin).

1. Solving for the Amount of Discretionary Mass from Food (Mf,discr)

a.) The Gut Model 560

Figure 4:
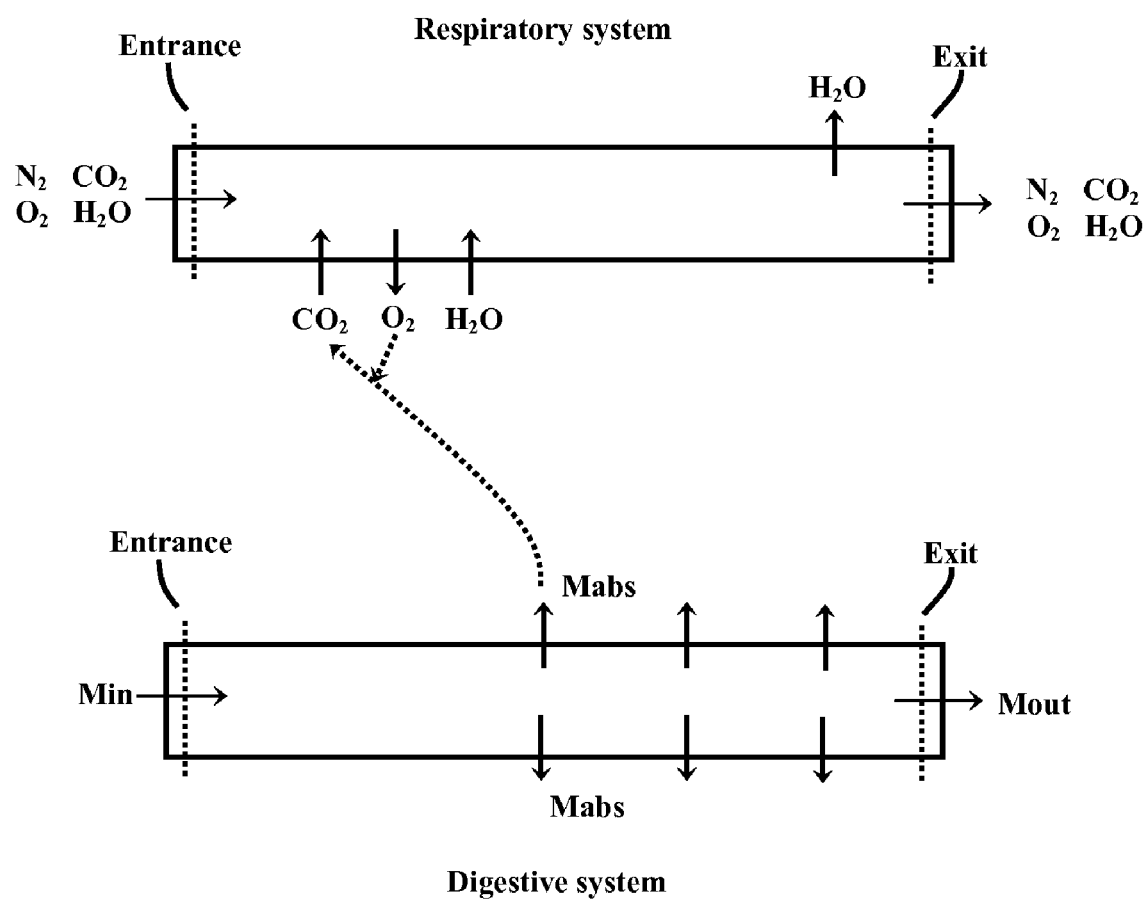
FIG. 4, is a representation of the molar balance models of respiratory and digestive systems coupled to each other and to metabolic heat demand to maintain core temperature.

The gut model 560 couples food ingested to respiratory gas exchanges and evaporative water loss from the respiratory system. FIG. 4 shows the system diagram for the molar balance gut model 560. It is related to the well-known batch reactor and plug flow model originally developed in chemical engineering and subsequently applied to animal digestive systems (see, Penry, D. L. and P. A. Jumars, 1987. *Modeling animal guts as chemical reactors*. Am. Nat. 129:69–96). The model used in the present invention allows for any type of ingested food consisting of user specified proportions of carbohydrates, lipids, proteins and water content. The food can enter the gut any time during activity time in any amount, subject to the constraint that the volume of food ingested per day may not exceed the wet mass of the animal. The energy value of absorbed carbohydrates, lipids, and proteins is well known (see, Schmidt-Nielsen, K. 1979. *Animal physiology, adaptation and environment*. 2d ed., Cambridge Univ. Press, Cambridge, Mass.).

The gut model 560 determines an upper bound for absorbed food. It does not explicitly consider important constraints on food intake that are affected by how food is distributed in the environment, which affects encounter probability, and what the handling time is, which is a function of feeding apparatus morphology. Both encounter probability and handling time may affect how much food is actually ingested. The present version of the gut model waits until a 24 hour activity simulation cycle starting at midnight has been completed. Then it looks back at the day's energy requirements and uses that to calculate how much of the food would have to be processed in the gut that day to meet those demands. Other cycle lengths could be used instead, depending on the user's interests.

The user specifies the food properties. They include percent of proteins, carbohydrates, lipid, and percent dry mass relative to wet mass. There is an upper bound constraint that the animal may never consume more wet weight food per day than its body mass.

The gut model 560 deals only with the part of the gut associated with the actual digestive process. Handling time and internal storage of food in the stomach(s) is not considered. These will place additional constraints on gut function. Because retention time may vary from approximately one-third of a day to more than a day, depending on body size, a day's energy requirements and the mass flow of food per day needed to meet those requirements are used. The total energy requirements are set to some factor of the energy needed to maintain core temperature on any particular day simulated. For example, the total energy requirements may be set to equal 3.5 times the energy needed to maintain the animal's core temperature on a particular day.

A digestive efficiency is set to a value depending on food type. For example, a digestive efficiency of 57% has been measured for seeds in small rodents and is very close to the value for digestive efficiency by cattle (61%). The model requires empirical data on digestive efficiency and food properties as defined above (these data are typically provided by the user but may instead be provided by the animal characteristics database 190 if appropriate data are contained therein). The gut model 560 assumes that the gut can alter flow rates to maintain the same digestive efficiency for a particular type of food.

Animals typically do not overeat or gain weight unnecessarily. The gut model 560 assumes that the amount of food ingested is determined by today's metabolic needs and is constrained by maximum volumetric flow rate less than or equal to body mass. The user defines percent digestive efficiency, percent water in feces, percent urea in urine, and a multiplier from 1 to 7 (timbas) above basal metabolic energy requirements to specify food intake to meet current needs. The user also defines percent protein, percent fat, percent carbohydrate, and percent dry matter in ingested food.

The dry grams of food needed to meet the metabolic demand are estimated based on food properties and the constraints specified above.

The gut model 560 is related to work by Penry and Jumars (1987, ref. above, incorporated herein by reference). Their equation (9), p. 73, for a batch reactor model is:

$$\text{time} = CA_o \int_0^{Xaf} (d\ XA/-rA)$$

where
XA=mole fraction of species A (dimensionless)
$XA=(CA_0-CA)/CA_0$
CA=food component, A, concentration (moles)
$CA_0$=initial concentration of food component, A, in moles.

Many of the components of reactor models are not known. Since the endotherm thermoregulatory model (described in previous section) can calculate metabolic heat production to maintain a specified core temperature (Qgen), it is straightforward to calculate the grams dry weight, and then wet weight of user-defined food to meet the metabolic demand. The following pseudo-equations are an example of these calculations for a seed diet by way of illustrating the method.

The amount of fat, protein, and carbohydrate per gram dry mass of food (gfatpg, gprotpg, gcarbpg, respectively) is first computed from user specified percentages of these components of food (pctfat, pctpro, pctcar, respectively), as in:

gfatpg=pctfat (g fat/g dry mass)

gprotpg=pctpro (g protein/g dry mass)

gcarbpg=pctcar (g digestible carbohydrate/g dry mass)

gsum=gfatpg+gprotpg+gcarbpg

Next undigested mass per gram dry mass of food (gundig) is calculated and used to compute total carbohydrates (TOTCARB):

gundig=1.00−gsum

TOTCARB=gcarbpg+gundig

Then joules per gram dry food (TotJpgram) is calculated:

fatJpg=gfatpg*(9400.*4.185)(g fat/g dry food*calories/g fat*J/calorie)

protJpg=gprotpg*(4199*4.185)

carbJpg=TOTCARB*(4200.*4.185)

TotJpgram=fatJpg+protJpg+carbJpg

Not implemented here is the variable protein digestion efficiency (DigEff) for ruminants versus monogasters (approximately 75% vs. 13%). While proteins are important from a protein and amino acid balance standpoint, in terms of absolute energy available, it is a small factor, since alfalfa (reference number 100056) vs. grass forage (reference number 102250) varies from approximately 8.6% protein to 18.1% protein (US-Canadian nutrient compound composition tables, 1994). Seed protein is 15% (see, Kelrick, M. R. and J. A. MacMahon, 1985. *Nutritional and physical attributes of seeds of some common sagebrush-steppe plants: some implications for ecological theory and management*. J. Range Manage. 38(1):65–69).

Calculation of joules absorbed per gram of dry food (Jabspgr) is:

Jabspgr=fatJpg+protJpg+DigEff*carbJpg

The moles available/g dry food (Totmolpgram) can now be calculated:

Totmolpgram=gfatpg*850+gprotpg*137+ gcarbpg*180

The joules of chemical energy needed to be absorbed by the gut/day (FoodJ)=joules per second (J/s)*seconds/hour (s/h)*24 hours/day*basal multiplier for metabolic rate (i.e., activity above resting; timbas), can then be calculated:

FoodJ=Qmetab J/s*3600 s/h*24 h/d*timbas

The dry mass needed to be absorbed per day to meet the metabolic demand is then, DRYA=FoodJ/Jabspgr The grams of dry food that must be ingested per day (Drymas) and then the total moles of each of the foodstuffs (Totmoles) are calculated:

Drymas=DRYA/(1.0−gundigest)

Total moles available for absorption=moles/dry gram*dry grams

Totmoles=(gfatpg*850.+gprotpg*137+gcarbpg*180.) *drymas

The joules of food needed in the gut per day to meet resting metabolism plus user specified activity level=(J/DAY)*basal multiplier:

FoodJ=DaysMETAB*timbas

The needed grams of food absorbed per day=J needed/day/Food J/g:

DRYABS=FoodJ/Jabspgr

The grams dry food ingested per day=g absorb/DigEff:

Drymas=DRYABS/(1.0−gundigest)

Wetmas=Drymas/PctDry

The program band tests for whether the required food mass per day exceeds body mass. If it does, absorbed mass is reset to the maximum value allowed by body weight and energy available is adjusted accordingly.

Upprlim=Gmass
If (Wetmas .greaterthan. Upprlim), then
   Wetmas=Upprlim
   Drymas=Wetmas*PctDry
   DRYABS=Drymas*DigEff
   Jpdaymax=DRYABS/Jabspgr
   Jpsavail=Jpdaymax/(24.*3600.)
Endif Once it is known that the upper bound has not been exceeded, the day's joules of energy absorbed (DaysJabs) can be calculated.

DaysJabs=Jabspgr*DRYABS

The energy available, Avlnrg, in joules/s available can be calculated

Avlnrg=DaysJabs/(24.*3600.)

The g wet weight through the gut/day is then calculated (CRTOT) to monitor part of the water balance of the animal:

$$GW = (Drymas - PCTDRY*Drymas)/PCTDRY$$

$$CRTOT = gw + Drymas$$

The hourly dry grams absorbed of protein, fat and carbohydrate (GPROTH, GFATH, GCARBH, respectively) are also tracked for use in the growth model (see, Adolph and Porter, 1996. ref. above).

$$Dryinphr = DRYABS/24.$$

$$GPROTH = Dryinphr*gprotpg$$

$$GFATH = Dryinphr*gfatpg$$

$$GCARBH = Dryinphr*gcarbpg$$

Size dependent constraints appear when the energy (mass) needs for the day exceed the daily gut volume flow rate for the body size. Available activity time available is calculated. That can be used to back calculate required handling time of the food needed to meet the energetic demands and to estimate time efficiency of mass/energy acquisition for all body sizes for a given food type and configuration.

The model assumes 0.40 g water/g protein oxidized (from, Hainsworth, F. R. 1981. Animal physiology. Addison-Wesley Publ. Co., Reading, Mass.).

Proteins. The approximate gram molecular weight of amino acids is 137 g/mole based on an average over all 22 amino acids (based on on information from the CRC Handbook of Chemistry & Physics (1996)).

Lipids. Data from Guyton (Guyton, A. C., 1991. *Textbook of medical physiology*. 8$^{th}$ ed., W. B. Saunders, Philadelphia, Pa.) are used. The gut model assumes that triglycerides are used for energy. They are stearic acid (880 g/mol), oleic acid (879 g/mol) and palmitic acid (754 g/mol). Based on these data the model assumes as an average 850 g/mol. The model uses 4.7 calories/ml $O_2$ which is 9400 calories/g fat (see, Kleiber, 1975. *The fire of life. An introduction to animal energetics*. 2d ed. Krieger Publ. Co., Huntington, N.Y.). There are 1.07 g water produced/g lipid oxidized (see, Hainsworth 1981, ref. above).

Carbohydrates. The model assumes that glucose data values are 180 g/mol; 5.0 cal/ml $O_2$; 4200 calories/g (see, Kleiber 1975, ref. above) and that there are 0.56 g water produced/g carbohydrate oxidized (see, Hainsworth 1981, ref. above).

Digestion capability data used by the model come from several sources (see, Weiner, J. 1987. Limits to energy budget and tactics in energy investments during reproduction in the Djungarian hamster, Phodopu sungorus sungorus, Pallas 1770, in Reproductive energetics in mammals. Symp. Zool. Soc. London 57:167–187; Kenagy, G. J. et al. 1989. Energy requirements for lactationa nd postnatal growth in captive golden mantled ground squirrels. Physiol. Zool. 62:470–487; Peterson, C. C. et al. 1990. Sustained metabolic scope. Proc. Natl. Acad. Sci. 87(6):2324–2328). Seed component values come from Kelrick and MacMahon (1985, ref. above).

2. Solving for the Amount of Discretionary Mass from Water (Mw,discr).

Calculating the discretionary mass from water (Mw,discr) requires running the gut model 560 to calculate the mass of water absorbed (Mw,a). The lung model 570 calculates respiratory water loss and the skin evaporation model (i.e. the skin subroutine) computes water lost by evaporation due to convection. The difference between water absorbed and water loss is the discretionary water (Mw,discr). Water excreted in urine (Mw,u) is calculated based on the amount of protein in the diet (see below). As mentioned above, an improvement in the animal model 500 of the present invention is the addition of the distributed respiratory water loss, which represents lungs that span most of the body cavity. This innovation gives much better agreement of predicted metabolic rates with measured values and is achieved by use of the lung model 570.

a.) The Lung Model 570.

This subroutine is a molar balance for computing water loss from breathing. It uses the oxygen demand for maintaining a user-specified core temperature to compute the amount of air in and out of the lungs. The temperature of the exhaled air relative to ambient air temperature is assigned by the user. This is typically anywhere from 1–3° C. higher than ambient air. This in effect allows for recovery of water used to saturate air in the lungs, because air leaving the nares is assumed to be saturated at the exhaled air temperature.

Below are the basic calculations performed by the lung model 570.

The partial pressure of oxygen at current conditions is, $$PO_2 = BarPrs*PCTO_2$$

where,

BarPrs is barometric pressure (pascals)

$PCTO_2$ is the percent $O_2$ in air $PO_2$ is the partial pressure of $O_2$ (pascals)

The partial pressure of oxygen at standard temperature and pressure (STP) is $$RefPO_2 = 101325*RpctO_2$$

The lung model 570 calculates the total heat production needed to maintain a user-specified core temperature (Qgen), given the current environmental conditions and the animal's characteristics. Oxygen consumption is based on the calculated heat generation estimate to maintain body temperature (Qgen), corrected for substrate utilized and is calculated as follows:

Liters of $O_2$ per second at STP: (using data for equivalencies from Kleiber 1975, see ref. above)

if (RQ .eq. 1.0) then, carbohydrates are worth 4200 cal/g liter(STP)/s=J/s/((cal/J)*(kcal/cal)*(liters $O_2$/kcal))

$O_2STP = Qgen*Timbas/(4.185*1000*5.0)$ else if (RQ le. 0.7) then, fat; fat's worth 9400 cal/g $O_2STP = Qgen*Timbas/(4.185*1000*4.7)$ else protein (RQ=0.8); proteins worth 4300 cal/g on average $O_2STP = Qgen*Timbas/(4.185*1000.*4.5)$ where, Timbas is the basal multiplier Qgen is the current guess for total heat generation RQ is the respiratory quotient Converting $O_2STP$ to the volume of $O_2$ at the animal's core temperature, the general equation (V1*P1/T1)=(V2*P2/T2) is rearranged to solve for volume of oxygen consumed and the ideal gas law is used:

$n = PV/RT$ (Ideal gas law: number of moles from pressure, volume, temperature)

$$VO_2CON = (O_2STP*RefPO_2/273.15)*((Tlung + 273.15)/PO_2)$$

where, $O_2MOLC = O_2$ consumed/second $= PO_2*VO_2CON/(RGC*(Tlung+273.15))$

Tlung=the temperature in the lungs obtained from a solution for the average temperature from the core to the skin obtained from integration.

MOLES/s $O_2$, $N_2$, & dry air AT 1: (1 refers to entrance of respiratory system, while 2 refers to the exit, see FIG. 4) (Air flow=f($O_2$ consumption)

$O_2MOL1 = O_2MOLC/(EXTREF/100)$ $N_2MOL1 = O_2MOL1*(PCTN_2/PCTO_2)$

Demand for air=$f(\%O_2$ in the air and elevation)

Note that as long as all 3 percentages add to 100%, no change in air flow occurs, unless one corrects for change in %$O_2$ in the air and elevation changes relative to sea level.

$AIRML1 = O_2MOL1*((PCTN_2+PCTO_2+PCTCO_2/PCTO_2)*(RpctO_2/PctO_2)*(RefPO_2/PO_2)$ Air volume at STP (liters/s)*(s/hour)

$AirVol = (Airml1*RGC*273.15/101325.)*3600.$

Computing the vapor pressure at saturation for the subsequent calculation of actual moles of water based on actual relative humidity, rhsat=100

CALL WETair(Tair,WB,rhsat,dP,BarPrs,E,ESAT,VD, RW,TVIR,TVINC,dENAIR,CP,WTRPOT)

Moles water/s in at 1 (entrance, see FIG. 4) based on relative humidity. Note that humidity is set to 99% in Main if animal is in burrow for the current hour.

$WMOL1 = AIRML1*(ESAT*(RELHUM/100.))/(BarPrs-ESAT*(RELHUM/100))$

MOLES/s of dry air AT 2: (EXIT)

$O_2MOL2 = O_2MOL1 - O_2MOLC$ $N_2MOL2 = N_2MOL1$ $CO_2MOL = RQ*O_2MOLC$

Total moles of air at 2 (exit, see FIG. 4) will be approximately the same as at 1 (entrance), since the moles of $O_2$ removed=approx. the number of moles of $CO_2$ added. Avogadro's number specifies the number of molecules/mole.

$AIRML2 = O_2MOL2+CO_2MOL)*((PCTN_2+PCTO_2/PCTO_2)*(RpctO_2/PctO_2)*(RefPO_2/PO_2)$ Setting up call to WETair; TEMP. OF EXHALED AIR close to AIR TEMP, assuming saturated air at exhalation,

RELXIT=100

Kangaroo physiology (Schmidt-Nielsen, K., et al. 1970. *Counter-current heat exchange in the respiratory passages: Effect on water and heat balance*. Resp. Physiol. 9: 263–276) shows Ta,exit-Ta=3C.

$TAEXIT = Tair+DELTAR$

Not letting internal air go below 0 C. for stability purposes:

If (Taexit .lt. 1.0) then
  Taexit=1.0
Endif

Calculating saturation vapor pressure (Esat) at exit temperature.

CALL WETair (TAEXIT,WB,repELXIT,dP,BarPrs,E, ESAT,VD,repW,TVIR,TVINC,dENAIR,CP,WTR-POT)

$WMOL2 = AIRML2*(ESAT/(BarPrs-ESAT))$

ENTHALPY=U2-U1, internal energy only, i.e., LAT. HEAT OF VAP are only involved, since P,V, and T are assumed to be constant, thus not significant.

FLOW ENERGY, $PV$. ($H = U + PV$)

Moles/s lost by breathing: EVPMOL=WMOL2-WMOL1

Grams/s lost by breathing=moles lost*gram molecular weight of water:

$Mw$,evap,resp=$EVPMOL*18$.

A cap is put on water loss for small animals in very cold conditions by assuming they will seek more moderate conditions if they exceed this cap. This will improve stability for the solution method (based on data from W. R. Welch. 1980. *Evaporative Water Loss from Endotherms in Thermally and Hygrically Complex Environments. An Empirical Approach for Interspecific Comparisons*. J. Comp. Physiol. 139: 135–143). The maximum value recorded for Prairie Dogs was 0.6 g/(kg-h)=$1.667 \times 10^{**}-4$ g/(kg-s). The highest recorded rate was for a resting deer mouse at 8 g/kg-h=$2.22E-03*$ (Edwards & Haines. 1978. J. Comp. Physiol. 128: 177–184 in Welch, 1980). For a 0.01 kg animal, the max. rate would be $1.67 \times 10^{**}-6$ g/s.

$Tesval = 2.22E-03*timbas*gmass/1000$

If (gevap .gt. Tesval) then,
  gevap=Tesval
endif
Kg/s lost by breathing:
  gperhr=gevap*3600
  KGEVAP=GEVAP/1000

Latent heat of vaporization from sub. DRYAIR (J/kg)

$HTOVPR = 2.5012E+06 - 2.3787E+03*Tlung$

Heat loss by breathing (J/s)=(J/kg)*(kg/s)

$Qresp = HTOVPR*KGEVAP$ b.) The Skin Subroutine.

The equations used to solve for the mass of water lost by evaporation from skin (Wevap,skin), is $Wevap,skin = Aeff*h_D*(VD_S - VD_A)$ Where Aeff is the effective surface area that behaves as a free water surface $h_D$ is the mass transfer coefficient computed from the heat transfer coefficient, $h_C$, using the Colborn Analogy (Bird, R. B., Stewart, W. E., and E. N. Lightfoot. 1960. Transport Phenomena. Wiley and Sons, New York)

$VD_S$ is the water vapor density at saturation at skin temperature $VD_A$ is the water vapor density at saturation at air temperature outside the animal's boundary layer.

The grams of free water absorbed from food (Mw,f) per hour, equals the total wet weight absorbed per hour minus the dry weight absorbed per hour, as in:

$Mw,f = (GTOTHR - PCTDRY*GTOTHR)/PCTDRY$

The grams of metabolic water (Mw,i) formed per hour is, $Mw,i = GPROTH*0.40 + GFATH*1.07 + GCARBH*0.56$ The grams of water lost in urine produced (Mw,u) per hour is, $GUREA = GPROTH*0.343$ $$GURINE = GUREA/PTUREA$$

$$Mw,u = (GURINE - GUREA)/1.0474$$

The water in feces (Mw,d), is g wet weight absorbed/hr=DigEff*g processed/hr $$gproch = (GFREWA + GTOTHR)/DigEff$$

$$WETFEC = gproch - (GFREWA + GTOTHR)$$

$$Mw,d = WETFEC*PFEWAT$$

The total amount of discretionary water available (Mw, avail) per hour from gut and excretory system is calculated as a function of diet, $$Mw,\text{avail} = Mw,f + Mw,i - Mw,u - Mw,d$$

Total discretionary mass from water is then, $$Mw,\text{discr} = Mw,\text{avail} - Mw,\text{evap,resp} - Mw,\text{evap,skin}$$

3. Solving for the Total Amount of Discretionary Energy (Qdiscr).

The total amount of discretionary energy available to the animal (Qdiscr) is then calculated as follows:

$$Q\text{discr} = Q\text{avail} - Q\text{gen}$$

iii. Calculating Total Activity Time

The total annual activity time of the animal is a key variable linking the individual energetics of an animal (as calculated by the animal model 500 described below) to population and community level phenomena (some of which may be included in the calculation of other variables 800 step described below). For example, total activity time can be used to calculate certain life history variables like survivorship, growth and reproductive potential (because feeding frequency and handling time affect mass and energy intake by an animal, and thereby discretionary mass and energy), that are, in turn, used to calculate population dynamics.

The temperature dependent activity/feeding frequency of an animal (i.e. the time during which an animal is active) is calculated as a linear function of the percentage of thermally available habitat (from the microclimate conditions output 400). A summation of a day's preferred activity times over a month and over the year then yields total annual activity time for the animal.

The total annual activity time of the animal is a key variable linking the individual energetics of an animal (as calculated by the animal model 500 described below) to population and community level phenomena (some of which may be included in the calculation of other variables 800 step described below). For example, total activity time can be used to calculate certain life history variables like survivorship, growth and reproductive potential (because feeding frequency and handling time affect mass and energy intake by an animal, and thereby discretionary mass and energy), that are, in turn, used to calculate population dynamics.

The total annual activity time of the animal is calculated by summing the temperature-dependent activity/feeding frequency of the animal over all time intervals (over days, over months) totaling a year. The temperature-dependent activity/feeding frequency of the animal is determined by tracking the amount of time the animal is in its null condition as the animal model 500 is run—the null condition being initially defined by the user to be the normal activity/feeding time of the animal [e.g. whether the animal is active during the day (diurnal), night (nocturnal), dusk and dawn (crepuscular), etc.].

iv. Animal Model Conditions Output 600

The animal conditions output 600 may include many different types of calculations based on the user's preference. In general, the output 600 will include the values for several metabolic variables, the temperature-dependent activity/feeding frequency of the animal and the total annual activity time of the animal.

The metabolic variables include the solutions generated using the animal model 500 for several energy and mass metabolic variables (see FIG. 2). The heat balance solutions yield values for the metabolic heat generation needed to maintain the animal's core temperature (Qgen), the amount of heat entering the animal (Qin), the amount of heat leaving the animal (Qout). The mass balance equations yield values for the discretionary mass from food and water (Mdiscr) by calculating the mass of food and water absorbed by the animal (Mf,a, Mw,a), the mass of food and water ingested by the animal (Mf,i, Mw,i), the mass of food and water excreted and evaporated (Mf,d, Mw,u, Mw,evap), and the mass of food and water metabolized by the animal (Mf,met, Mw, met). Also included among the metabolic variables calculated is the lung air flow (including total air mass and $CO_2$ production).

Optimal body size and other variables can be calculated for any given locality by simply looping through the range of body sizes specified by the user and selecting the size that best meets user criteria, such as maximum discretionary energy (see System and Method of Implementation section below).

d. Animal Model Conditions Database 700

The animal model conditions database 700 accumulates the animal conditions output 600 over all time intervals, localities and species for which the models are run. The cumulative data are organized in the database 700 in such a way as to facilitate further calculations and/or display options. The location and time information continues to be associated with the animal conditions 600 as calculated by the animal model 500. This allows for the subsequent coupling of the animal conditions data set 600 with its associated temporal and GIS based information on climate, topography and vegetation. In this way, they can be used to generate spatially and temporally explicit interpretations of animal energetics and behavior, and displayed 900 or made available for further calculations 800 as described below.

e. Calculation of Other Variables 800

Further calculations may be performed using information in the animal model conditions database 700. When the animal model conditions data 700 are coupled with GIS based information on climate, topography and vegetation, they can be used to generate spatially explicit interpretations of animal energetics and behavior.

For example optimal body size that maximizes discretionary mass or energy or other variables, optimal behaviors, intake of pollutants (e.g pesticides), growth and reproduction potential as function of discretionary mass and energy survivorship/mortality as function of total annual activity time, and spatial variation in all variables (see for examples of these kinds of calculations, Adolph and Porter 1993, 1996, refs. above; Porter 2000, ref. above). The animal conditions data 700 may also be used to calculate community structure (if run over several species/body sizes).

The analysis of spatial variations is also possible using the present invention. An example is given in the description of the system and method of implementation section below.

f. Display of Results 900

The data in the animal model conditions database 700 and generated by any further calculations 800 performed, may be organized and displayed in any number of ways. Any number of kinds of tables and graphs may be generated to display the data to best communicate the results of the model. In particular, the data may be organized in tables particularly suited to use by spatial plotting software (such as ARCVIEW) to allow the data to be plotted in geographic space.

g. Applications of the Method

The method of the present invention can be applied to many and varied situations. Several examples follow.

ii. Management and Preservation of Threatened or Endangered Species

One of the primary utilities of the present invention is to provide fully integrated microclimate and animal models which may be used in coordination to accurately predict the effects of climate and other environmental conditions on animals, that require relatively few, easily measured data to estimate food and water requirements, potential for activity time, growth, and reproduction for a wide variety of habitats. The fact that relatively few data are required is important to the present invention's application to animals in nature generally, because it eliminates the need for extensive sampling or smaller or otherwise difficult to sample populations. The present invention can generate the information necessary to identify potential reserves or transplantation sites, and to modify or manage existing habitats to optimize the growth, reproduction and survivorship of threatened or endangered species.

Today, many species of animals are endangered. Often the cause of the endangerment is loss of their natural habitats to development or other land uses. Efforts to conserve the species require knowledge of the animal's adaptations to the environments in which they evolved, including their basic energetics. The question becomes one of how the animal will react both physiologically and behaviorally to the changes in their environments due to the changes in their natural habitats, displacement to new habitats, or other environmental influences.

In this example, the integrated microclimate and animal models of the present invention were used to calculate the metabolic costs and food requirements of an endangered species of parrot, the Orange-bellied Parrot of Tasmania and Australia (*Neophema chrysogaster*, see, Porter et.al, 2000. Amer. Zoo., 40:597–630). With only approximately 200 individuals still alive, reliable estimates of the metabolic cost, the necessary foraging time and amount of food required to sustain the parrot in its seasonal habitats could lead to quantitative estimates of the amount of habitat needed to assure its survival. That information can then be used to guide conservation efforts to preserve or otherwise modify the environment of the parrot so that its discretionary energy and water, and activity time are optimized resulting in increased growth, reproduction and survivorship.

Figure 6:
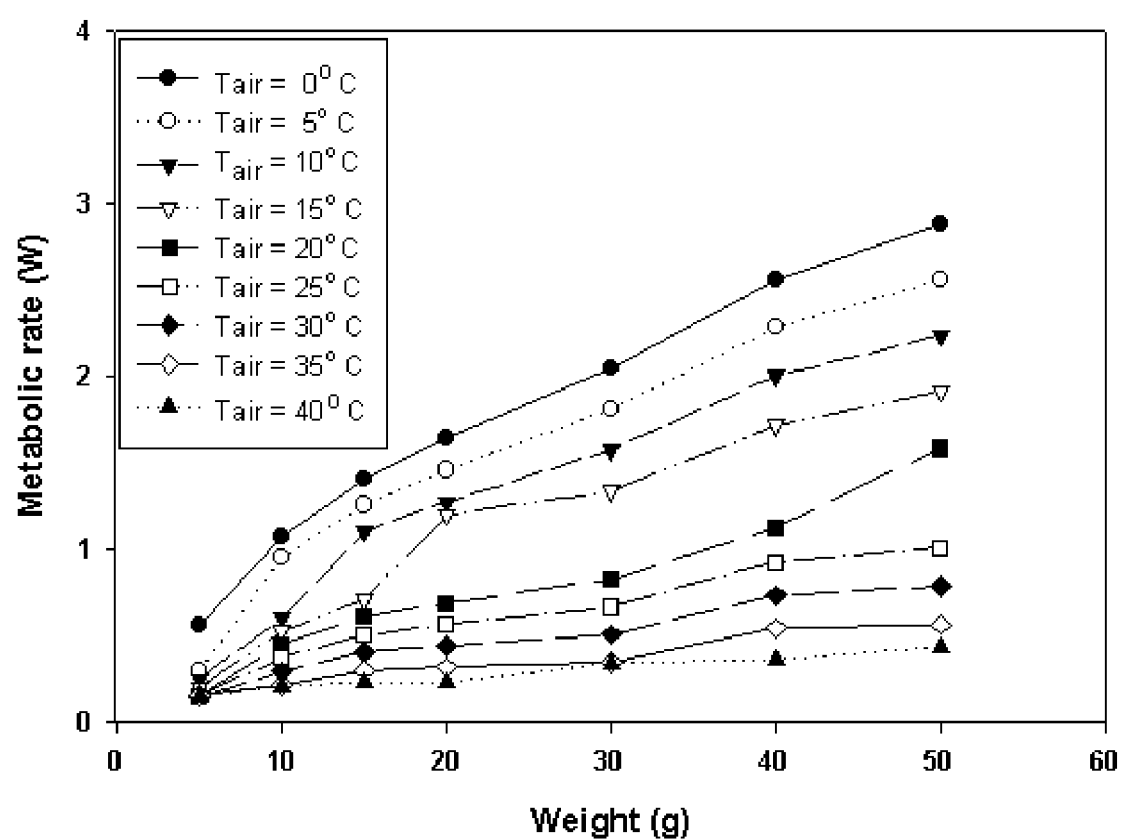
FIG. 6, is a graph showing results generated by the present invention, that show the variation in metabolic rate as a function of mass and temperature for the Orange-bellied Parrot.

Using the method of the present invention, parrot metabolism was calculated across a range of temperatures experienced by the bird. These calculations were then used to estimate the parrot's energy use requirements in its native habitat. The results for metabolic rate variation with changes in air temperature and with size of the bird (mass) are plotted in FIG. 6. These results suggest that temperatures lower than 5 degrees C. are stressful to hatchlings of lower mass. The method was also applied to calculate the effects of a range of foodstuffs ingested by the birds, on their growth and reproduction. These resulting data can be used to guide conservation efforts of the birds.

ii. How Vegetation Alters the Effect of Climate on Food Requirements, Geographic Range, and Predator-prey Interactions Vegetation can have an effect on the microclimates experienced by animals in addition to its role as a food source for some. Several of these effects are reported in Porter et al. (2001. *Physiology on a landscape scale: plant-animal interactions*. Unpublished manuscript). Below are summarized the reported effects of climate on food requirements and geographic range. Knowing these effects, managers of animals may modify environments accordingly to ensure the well-being of the animals.

The present invention was employed to answer the question of how fires in Yellowstone National Park altered the nighttime thermal environment and energetic requirements of Elk overwintering in the park. Because the fires removed tree needles, the Elk were exposed to potentially cold stressful thermal conditions over the winter nights. The method of the present invention was employed to simulate the microclimates at the park in burned versus unburned locations, and the energetic costs and food requirements of similar sized elk compared. The results indicated that Elk in unburned locations required 20–25% less diurnal energy than did Elk in burned locations. The results further indicated that the differences in infrared radiation, not wind, resulting from the burn, was the major factor influencing the difference in energy requirements of the elk. Knowing these results, those tending the Elk herds may be able to design feeding or other strategies to reduce the energetic stresses to the Elk, or otherwise modify their management practices.

The way in which the thermal environment and vegetation (representing available resources) interact to determine the distribution of an animal, was investigated using the method of the present invention applied to the chuckwalla, *Sauromalus obseseus*, in the southwestern desert of the U.S. and Mexico. The models of the present invention were used to calculate temperatures in the chuckwalla's environments across the entire North American continent. Calculated patterns of degree days, coupled with GIS data on soil and vegetation types were compared to the known geographic distribution of chuckwallas. Plotting the results and comparing among the effects of temperature and vegetation/food, conclusions could be made on which factor(s) limit the animal's distribution. It was discovered that the northern limit of distributions may be constrained by egg incubation requirements and that the other boundaries of the distribution may be constrained by vegetation/food requirements.

A plot of the degrees days available across the continent is shown in FIG. 7, with the chuckwalla's range noted and the minimum degree days required for successful hatch of eggs specified (1705 degree days), by way of example. The plot represents the result of microclimate effects on soil temperature calculations for every degree latitude and longitude in North and Central America. Soil temperatures were calculated by the microclimate model of the present invention at the surface, and various depths below the surface. Only soil temperatures at a 15 cm depth were accumulated into a measure of "degree days." The calculations were for horizontal exposed soil with no shade on it. Successful chuckwalla egg incubation requires approximately 1700 degree days. Almost all of the current chuckwalla distribution lies in areas where the soil temperatures meet these minimum incubation requirements. If soil temperature alone is considered, the resulting plot suggests that the species should be able to live in Mexico and Central America. Why not? The other analyses suggest that vegetation type may be a critical variable limiting the chuckwallas distribution to the east, west and south. These results how the present invention may be employed to help manage the chuckwalla population in order to, for example, enable it to expand to the south, east or west, by modifying the vegetation/food available to it in those areas.

iii. Other Examples of Applications of the Present Invention

Many other uses of the present invention are possible. Above are represented a few of the uses relating to the conservation and management of animals. Those examples may be expanded to include applications to the management of biodiversity, zoo populations and the like.

Other uses may include the analysis of disease vectors (e.g. mosquito vector) and how the effects of climate on their distributions may affect the spread of diseases. Still other uses include how pesticides may effect the energetics and survivorship of animals by quantifying the exposure of the animals; how the microclimate conditions experienced by animals stored in the cargo holds of airplanes are affected by the conditions they experience in order to increase survivorship by better controlling those environments (for example, carbon dioxide production by animals and oxygen availability as a function of the type of cargo hold, air flow and altitude); calculation of activity time, mass, and energy budgets for rare and endangered species to aid in their management (examples of species already investigated using the present invention include the giant panda of China, the Arabian Oryx on the Arabian Peninsula, the Yunnan snub nosed monkey on the China-Burma border, Puerto Rican parrots in Puerto Rico, marsupial gliders in Australia); assessment of the impact of manmade disturbances on the time, energy, and mass balances of rare and endangered species; forensic analyses to assess approximate time of killing of rare and endangered species in a natural habitat; environmental impacts of controlled burns in forests or national parks; assessment of climate change on distributions of animals in the past, present, or future; assessment of the impact of climate change on animal body size in the past present or the future; identification of regions of high natural selection pressures on animals in space and time; the design of animal shelters and animal husbandry practices in developing countries; and, dynamic changes in food web structure as influenced by climate, topography, and vegetation. This is a partial list of present and potential applications of the present invention.

DETAILED DESCRIPTION—METHOD & SYSTEM OF IMPLEMENTATION

As described above and referring to FIG. 1, the method for calculating the effects of environmental conditions on animals of the present invention includes the provision of databases of environmental conditions (i.e.. the environmental conditions database 100) and animal characteristics data (i.e.. the animal characteristics database 190) for use in forming sets of environmental 120 and animal 170 data to be input to the microclimate 300 and animal 500 models. These databases (100 and 190) may be very large (currently on the order of 9 terabytes/table for the database MySQL). If used as input files instead of database tables, their size limits their accessibility by users who do not have access to larger mainframe computers. Such users are limited by the amount of memory and speed of their computers. The present invention using Practical Extraction and Report Language (PERL) and MySQL, addresses this problem by providing a method and system for its implementation on smaller computers, including personal computers. This allows many more users access to the methodology of the present invention and should enable its more widespread use among researchers, conservationists and other parties interested in understanding and managing animals.

Figure 8:
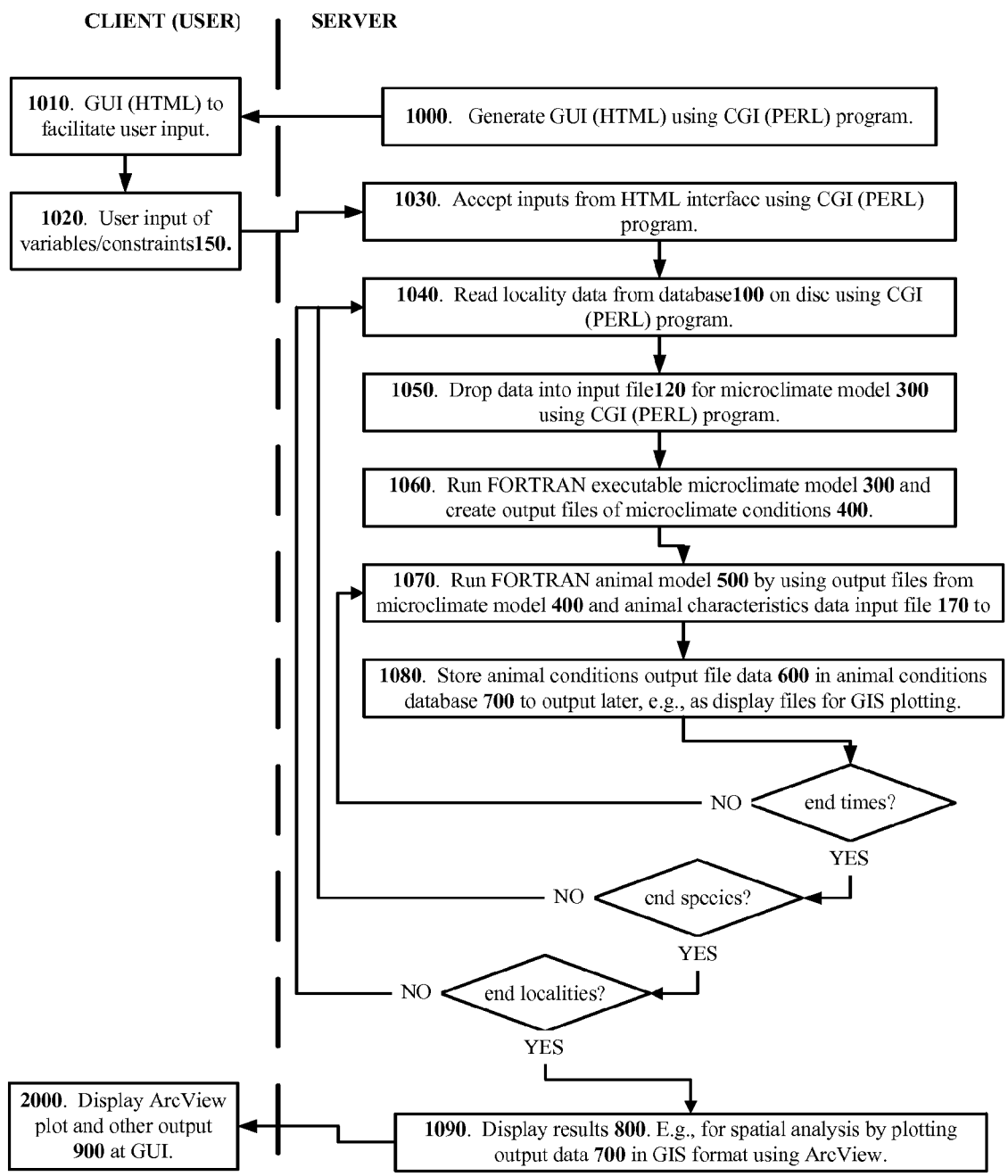
FIG. 8, is a flow diagram depicting the general system of the present invention as implemented in a client-server environment.
Figure 10:
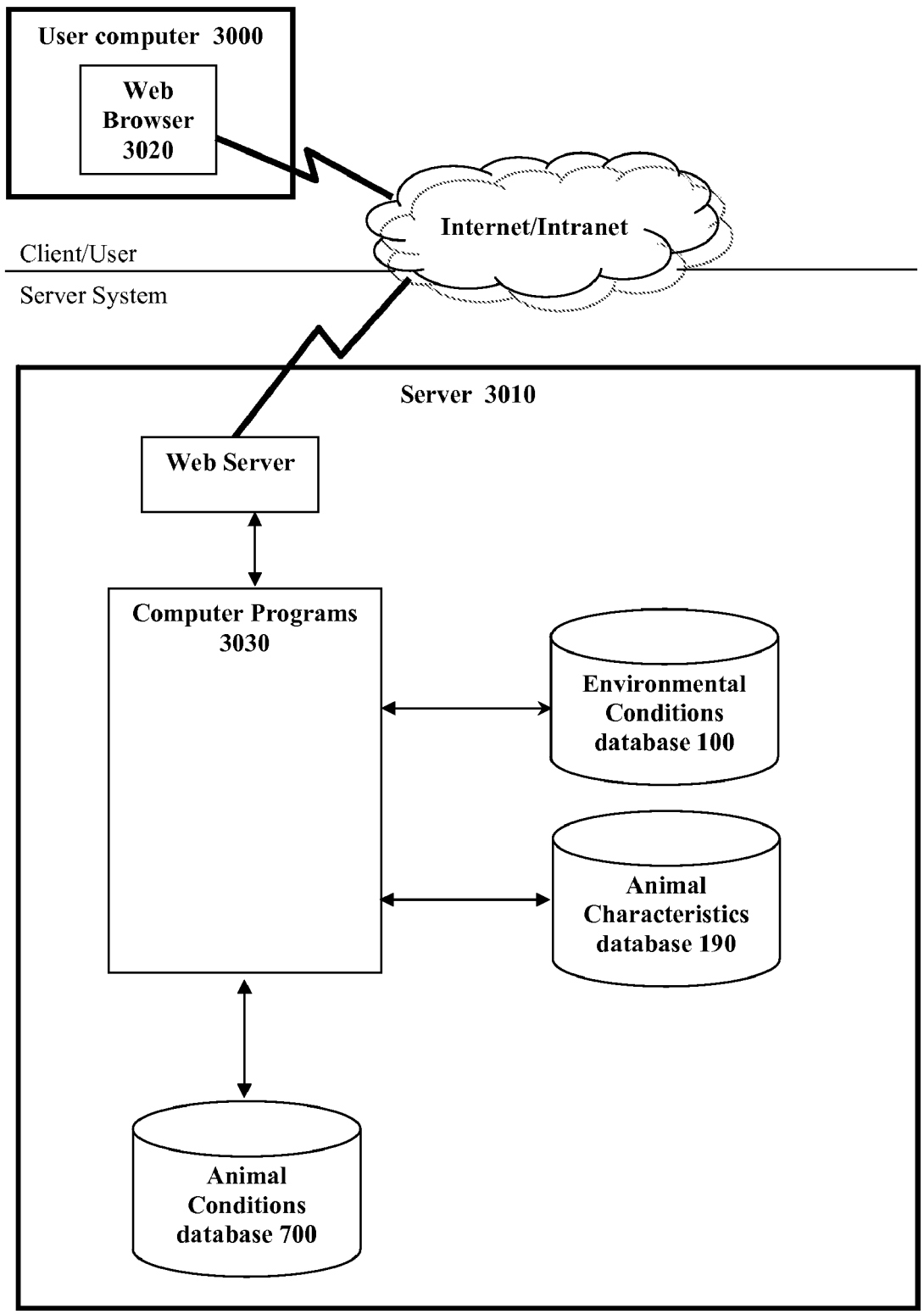
FIG. 10, is a depiction of the basic components of the system of the present invention.

Referring to FIGS. 8 and 10, one embodiment of the system and method for implementing the present invention is summarized in a flow chart (FIG. 8) and basic system drawing (FIG. 10). FIG. 8 is presented to explain the basic steps in the method of implementation of the present invention that allow a user to access and process the large amounts of data necessary, using minimal RAM memory and disc space on a computer. Multiple modes of implementation of the present invention are, of course, possible. As depicted in FIGS. 8 and 10, the system is a client-server system, where the user's computer 3000 is on the client side and the server 3010 may be located elsewhere on an Intranet or Internet. The same basic methodology could, however, be employed on a single computer with sufficient memory and disc space to store the databases and run the programs.

The method comprises the generation of a graphical user interface (GUI) to the Web browser 3020 of the user's computer 3000 (1000 and 1010 in FIG. 8). The GUI can be customized to suit the particular application. For example, it can be customized for use by managers of endangered species to provide them choices and options that users in that field might typically want, or for use by environmental consultants. Likewise, an alternative GUI may be customized with features more appropriate to the researcher in a lab or field setting, or the like.

In this embodiment, the GUI is provided in Hypertext Markup Language (HTML) for implementation with the client's Web browser 3020 and is generated by a PERL program running at the server. However other types of Common Gateway Interface (CGI) programming languages may be employed besides PERL, and the GUI provided in other languages besides HTML. The PERL driver, however, enables use of the databases rather than files for the inputs/outputs, thereby minimizing the memory required and speeding the processing. This, in turn, allows for the implementation on smaller computers. It also allows the use of massive sets of data, thereby enabling the spatial and high resolution temporal analyses possible using the present invention.

The user then inputs a set of variables and/or conditions 150 to be used by the microclimate 300 and/or animal 500 models of the present invention 1020. A PERL program at the server (3030, representing all computer programs running at the server including the animal and microclimate model programs, output display programs, and the like) receives the user input 150 in HTML, or by direct manipulation of the PERL code 1030. The PERL program also reads one or more database tables contained in the environmental conditions database 100 and that supply input information about the environmental conditions (e.g., elevation, slope, aspect, vegetation type, and substrate type as a function of geographic coordinates) by locality 1040. After processing each locality input data set, the PERL program modifies the input data file to the microclimate model 1050. After each input file modification, the PERL program calls the microclimate program 300 to run 1060. Two output files (called metout and soil) are created that form the above ground and below ground microclimate conditions 400 used as input for the animal model 500. As depicted in FIG. 8, the microclimate model 300 is programmed in FORTRAN, however, other programming languages may alternatively be employed.

Depending upon how the user has specified animal data input (in the user-defined variables and conditions 150), the PERL program will modify the animal input database 190 to form the set of animal characteristics data 170 for input to the animal model program 500. The animal model program 500 is then run using the microclimate conditions 400 output from the microclimate model 300, and the animal characteristics data set 170, 1070. The animal conditions output 600 is stored in an animal conditions database 700, 1080, for later display 900 and/or further calculations 800.

If more time intervals remain, the animal model is run again 1070. At the end of all time interval runs, the program checks if the user has specified that other animal species are to be considered. If so, the program repeats from step 1040 until all species are considered. The program then likewise executes over all localities under consideration, by repeating step 1040 on.

At the end of all runs, the data in the animal conditions database 700 may be accessed for further calculations 800 or for display 900. In FIG. 8, an example of displaying the results geographically is portrayed at 1090, in which the data are plot in GIS format using Arcview. These data are then provided to the GUI at the user/client 2000, and the plot, or other results, displayed.

The user may specify that any number of calculations be made by the model at 1020. Depending on those specifications, the model(s) may repeat in several iterations, varying the data inputs each time. In this way a user may compare outputs for different body sizes or other animal variables to find, for example, an optimal body size or how variables vary spatially (described below), among many other possibilities.

Optimal body size. Optimal body size and other variables can be calculated for any given locality by simply looping through the range of body sizes specified by the user and selecting the size that best meets user criteria, such as maximum discretionary energy. These kinds of loops are in the driver code in PERL and are external to the FORTRAN executable elements called by the PERL code.

Spatial analysis of animal energetics. The spatial analysis of animal energetics starts by assembling data files that include digital elevation maps (DEMs). This process can often be done by accessing files of quadrangle maps from various sources online such as various United States government agencies. Alternatively, private corporations either have available or will create for a fee, digital elevation maps of anywhere on earth, thus enabling the input of geographic data for just about anywhere to the models of the present invention. Digital elevation maps can be displayed in GIS programs, such as ArcView. Boundary maps or other geographic information can be superimposed on these images. ArcView can then translate this topographic image into an analysis of elevation. Slope and aspect (azimuth) of each "pixel" of information can be calculated as well. These maps have a resolution of 30 m, so each "pixel" is 30 m on a side. These data can be exported into a text table. The collection of these data from separate tables into a single table that can be read by PERL (or other similar program) is easily automated.

Each row of a table represents a unique location and the data associated with that location. For example, a row of data may contain latitude, longitude, elevation, slope, aspect, vegetation type, and soil type. Those data are then loaded into a database table. The PERL program reads the input database table, one row at a time. Those data are used to modify the input data file for the microclimate model 300, basically modifying the geographic coordinates and other appropriate data in the input file to correspond to the particular location represented by the current row being read from the database table. Generally, a full year of microclimate simulations are run for each location and then the output is passed to the animal model 500.

Figure 9:
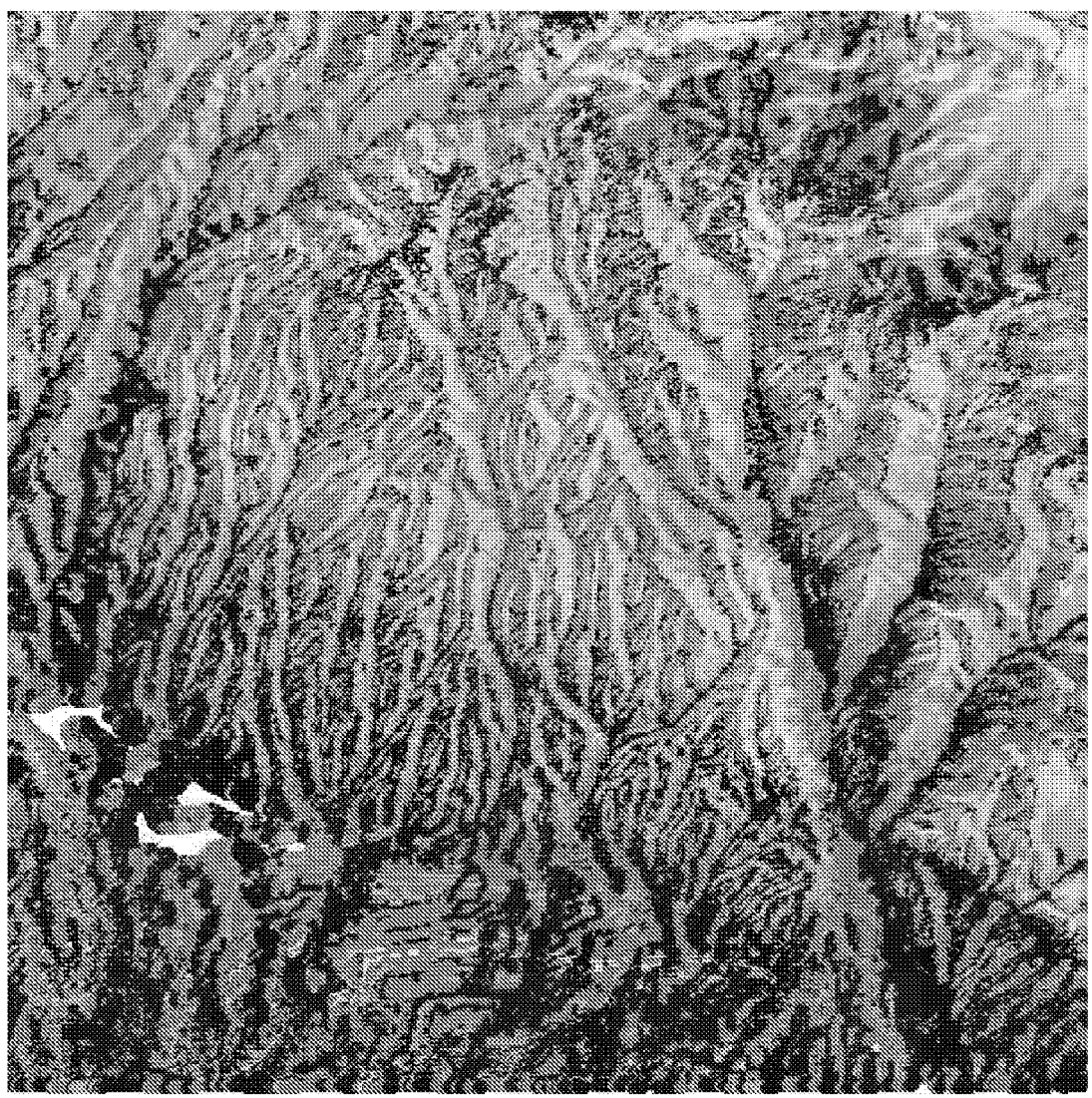
FIG. 9, is a spatial plot summarizing the discretionary energy of a 60 kg Mountain Lion for the month of July, as a function of slope and aspect of the topography of a portion of its range.

After all animal simulations are done for the same location, the PERL program reads another line from the database input table and repeats the process. After all calculations for a location are completed, the animal conditions output data 600 are written to the animal conditions database 700 output table. Its format is similar to the input data table, in that the first two entries in every row are the latitude and longitude followed by various animal output data for each month of the year and accumulated over the entire year. This output data table becomes the input table for ArcView or other GIS program that can plot discrete columns of output as a function of latitude and longitude and display the information graphically. FIG. 9 is an example of such a plot showing the amount of discretionary energy (kJ/d) of a 60 kg Mountain Lion for the month of July, as a function of slope and aspect of the topography for a particular quadrangle of its range. Activity time, as well as other variables, may likewise be plotted spatially.

While the above description contains many specificities, these should not be construed as limitations on the scope of the invention, but rather as an exemplification of the presently preferred embodiments thereof. The above-described embodiments are set forth by way of example and are not for the purpose of limiting the present invention. It will be readily apparent to those skilled in the art that obvious modifications, derivations and variations can be made to the embodiments without departing from the scope of the invention. Accordingly, the scope of the invention should be determined not by the examples given, but by the appended claims and their legal equivalents.

We claim:

1. A method of using a computer for calculating an at least one effect of a plurality of environmental conditions on an animal, using said computer to perform the following steps comprising:

providing a data set of the plurality of environmental conditions for an at least one locality during an at least one time interval;

providing a data set of characteristics of the animal;

translating the data set of environmental conditions into a set of microclimate conditions experienced by the animal, by running a microclimate model to generate values for the set of microclimate conditions using the data set of environmental conditions and the data set of animal characteristics, the microclimate model comprising a solar radiation model to enable the calculation of an input of solar radiation when the sun is above the horizon and when the sun is below the horizon; and, solving for a set of animal conditions by running an animal model using the set of microclimate conditions and the data set of animal characteristics, for each of the at least one time intervals at each of the at least one localities, the set of animal conditions comprising an amount of discretionary energy and an amount of discretionary water available to the animal, and a total activity time of the animal.

2. The method of claim 1, further comprising storing the set of animal conditions data in an animal conditions database.

3. The method of claim 2, further comprising calculating an at least one user-specifiable variable using the data stored in the animal conditions database.

4. The method of claim 3, wherein the at least one user-specifiable variable comprises a reproductive potential of the animal calculated by using the amounts of discretionary energy and water available to the animal.

5. The method of claim 3, wherein the at least one user-specifiable variable comprises a growth potential of the animal calculated by using the amounts of discretionary energy and water available to the animal.

6. The method of claim 3, wherein the at least one user-specifiable variable comprises a mortality rate of the animal calculated by using the total activity time of the animal.

7. The method of claim 3, wherein the at least one user-specifiable variable comprises an optimal body size of the animal for the at least one locality and for the at least one time interval.

8. The method of claim 1, further comprising displaying the set of animal conditions data.

9. The method of claim 8, wherein displaying the set of animal conditions comprises plotting the set of animal conditions by locality to analyze a spatial variation in the animal conditions.

10. The method of claim 1, wherein running the animal model comprises:
calculating an amount of metabolic heat generation required to maintain a core temperature of the animal and noting an activity state of the animal, by performing a heat balance analysis, the activity state being chosen from the group consisting of active and non-active;
calculating the amount of discretionary energy available to the animal and the amount of discretionary water available to the animal by performing a mass balance analysis using the calculated amount of metabolic heat generation; and,
calculating the total activity time of the animal by summing the at least one time intervals at which the activity state of the animal was noted to be active.

11. The animal model of claim 10, wherein performing the heat balance analysis comprises:
computing an amount of solar radiation absorbed by the animal;
estimating the amount of metabolic heat generation required to maintain the core temperature of the animal;
computing a skin temperature of the animal using the estimated amount of metabolic heat generation and the computed amount of solar radiation absorbed by the animal;
calculating a plurality of heat fluxes between the animal and its environment and calculating a net heat exchange for the animal;
solving a heat balance equation to compute an error value;
if the error value is greater than a pre-specified maximum value, repeating the previous steps from the estimating the amount of metabolic heat generation step to the current step;
if the error value is less than or equal to the pre-specified maximum value, running a thermoregulatory model comprising;
computing a core-skin temperature differential as the difference between the core temperature of the animal and the skin temperature of the animal and comparing the core-skin temperature differential to a pre-specified minimum value;
if the core-skin differential is less than the pre-specified minimum value, exercising an option in a hierarchy of behavioral and physiological options, and repeating the previous steps from the estimating the amount of metabolic heat generation step to the computing a core-skin temperature differential step; and,
if the core-skin differential is greater than or equal to the pre-specified minimum value, setting the calculated value for metabolic heat generation equal to the estimated value of the amount of metabolic heat generation.

12. The method of claim 11, wherein the calculating a plurality of heat fluxes comprises running a porous media model for insulation.

13. The method of claim 12, wherein the porous media model comprises a solar radiation component to calculate an amount of solar radiation absorbed by the animal.

14. The method of claim 12, wherein the porous media model further comprises an appendage model to calculate an amount of heat exchange at an at least one appendage of the animal.

15. The method of claim 10, wherein performing the mass balance analysis comprises running a gut model coupled to a lung model.

16. The mass balance analysis of claim 15, further comprising running a skin subroutine to calculate an amount of water loss by evaporation at the skin of the animal.

17. The method of claim 1, wherein each of the at least one localities is defined by a set of geographic coordinates.

18. The method of claim 1, wherein the at least one time intervals comprise hours, days, months and a year.

19. The method of claim 1, wherein the data set of environmental conditions comprises data provided by an environmental conditions database.

20. The method of claim 19, wherein the data set of environmental conditions further comprises data provided by a user.

21. The method of claim 20, wherein the data provided by a user comprises a specification of the at least one locality and the at least one time interval.

22. The method of claim 1, wherein the data set of environmental conditions comprise a temperature, a rainfall amount, a wind velocity and direction, and a solar and infrared radiation at each of the at least one localities for at least one of the at least one time intervals.

23. The method of claim 22, wherein the data set of environmental conditions further comprises a soil type, a slope of the terrain and an aspect of the terrain at each of the at least one localities.

24. The method of claim 23, wherein the set of microclimate conditions comprises a temperature profile as a function of the slope of the terrain.

25. The method of claim 22, wherein the set of environmental conditions further comprises a type and abundance of plant cover.

26. The method of claim 25, wherein the set of microclimate conditions comprises a temperature profile as a function of the type and abundance of plant cover.

27. The method of claim 25, wherein the set of microclimate conditions comprises a wind profile as a function of the type and abundance of plant cover.

28. The method of claim 1, wherein the set of microclimate conditions experienced by the animal comprise a clear sky solar radiation, an infrared fluxes from the sky and ground, and a temperature, a velocity and a relative humidity of air passing over the animal at an average height of the animal above ground, and a percentage of thermally available habitat.

29. The method of claim 1, wherein the data set of animal characteristics comprises data on a body allometry, a physiology and a morphology of the animal.

30. The method of claim 29, wherein the data on the animal's body allometry comprise a body weight, a body dimensions and a body geometry of the animal.

31. The method of claim 29, wherein the data on the animal's physiology comprise a core temperature of the animal.

32. The method of claim 29, wherein the data on the animal's morphology comprise a mean length of fibers, a fiber density per depth, a fiber diameter, a depth of insulation, a solar reflectivity of fibers, and a transmissivity of fibers.

33. The method of claim 1, wherein the data set of animal characteristics comprises data provided by an animal characteristics database.

34. The method of claim 1, wherein the data set of animal characteristics further comprises data provided by a user.

35. The method of claim 34, wherein the data provided by a user comprises a diet, a preferred temperature range and an average height above ground of the animal.

36. A method of using a computer for calculating an at least one effect of a plurality of environmental conditions on an animal, using said computer to perform the following steps comprising:
providing a data set of the plurality of environmental conditions for an at least one locality during an at least one time interval;
providing a data set of characteristics of the animal;
translating the data set of environmental conditions into a set of microclimate conditions experienced by the animal, by running a microclimate model to generate values for the set of microclimate conditions using the data set of environmental conditions and the data set of animal characteristics; and,
solving for a set of animal conditions by running an animal model using the set of microclimate conditions and the data set of animal characteristics, for each of the at least one time intervals at each of the at least one localities, the set of animal conditions comprising an amount of discretionary energy and an amount of discretionary water available to the animal, and a total activity time of the animal, the running of the animal model, comprising:
calculating an amount of metabolic heat generation required to maintain a core temperature of the animal and noting an activity state of the animal, by performing a heat balance analysis, the activity state being chosen from the group consisting of active and non-active;
calculating the amount of discretionary energy available to the animal and the amount of discretionary water available to the animal by performing a mass balance analysis using the calculated amount of metabolic heat generation, performing the mass balance analysis comprising running a gut model coupled to a lung model; and,
calculating the total activity time of the animal by summing the at least one time intervals at which the activity state of the animal was noted to be active.

37. The mass balance analysis of claim 36, further comprising running a skin subroutine to calculate an amount of water loss by evaporation at the skin of the animal.

38. The method of claim 36, further comprising storing the set of animal conditions data in an animal conditions database.

39. The method of claim 38, further comprising calculating an at least one user-specifiable variable using the data stored in the animal conditions database.

40. The method of claim 39, wherein the at least one user-specifiable variable comprises a reproductive potential of the animal calculated by using the amounts of discretionary energy and water available to the animal.

41. The method of claim 39, wherein the at least one user-specifiable variable comprises a growth potential of the animal calculated by using the amounts of discretionary energy and water available to the animal.

42. The method of claim 39, wherein the at least one user-specifiable variable comprises a mortality rate of the animal calculated by using the total activity time of the animal.

43. The method of claim 39, wherein the at least one user-specifiable variable comprises an optimal body size of the animal for the at least one locality and for the at least one time interval.

44. The method of claim 36, further comprising displaying the set of animal conditions data.

45. The method of claim 44, wherein displaying the set of animal conditions comprises plotting the set of animal conditions by locality to analyze a spatial variation in the animal conditions.

46. The method of claim 36, wherein the microclimate model comprises a solar radiation model to enable the calculation of an input of solar radiation when the sun is above the horizon and when the sun is below the horizon.

47. The animal model of claim 36, wherein performing the heat balance analysis comprises:
computing an amount of solar radiation absorbed by the animal;
estimating the amount of metabolic heat generation required to maintain the core temperature of the animal;
computing a skin temperature of the animal using the estimated amount of metabolic heat generation and the computed amount of solar radiation absorbed by the animal;
calculating a plurality of heat fluxes between the animal and its environment and calculating a net heat exchange for the animal;
solving a heat balance equation to compute an error value;
if the error value is greater than a pre-specified maximum value, repeating the previous steps from the estimating the amount of metabolic heat generation step to the current step;
if the error value is less than or equal to the pre-specified maximum value, running a thermoregulatory model comprising;
computing a core-skin temperature differential as the difference between the core temperature of the animal and the skin temperature of the animal and comparing the core-skin temperature differential to a pre-specified minimum value;
if the core-skin differential is less than the pre-specified minimum value, exercising an option in a hierarchy of behavioral and physiological options, and repeating the previous steps from the estimating the amount of metabolic heat generation step to the computing a core-skin temperature differential step; and,
if the core-skin differential is greater than or equal to the pre-specified minimum value, setting the calculated value for metabolic heat generation equal to the estimated value of the amount of metabolic heat generation.

48. The method of claim 47, wherein the calculating a plurality of heat fluxes comprises running a porous media model for insulation.

49. The method of claim 48, wherein the porous media model comprises a solar radiation component to calculate an amount of solar radiation absorbed by the animal.

50. The method of claim 48, wherein the porous media model further comprises an appendage model to calculate an amount of heat exchange at an at least one appendage of the animal.

51. The method of claim 36, wherein each of the at least one localities is defined by a set of geographic coordinates.

52. The method of claim 36, wherein the at least one time intervals comprise hours, days, months and a year.

53. The method of claim 36, wherein the data set of environmental conditions comprises data provided by an environmental conditions database.

54. The method of claim 53, wherein the data set of environmental conditions further comprises data provided by a user.

55. The method of claim 54, wherein the data provided by a user comprises a specification of the at least one locality and the at least one time interval.

56. The method of claim 36, wherein the data set of environmental conditions comprise a temperature, a rainfall amount, a wind velocity and direction, and a solar and infrared radiation at each of the at least one localities for at least one of the at least one time intervals.

57. The method of claim 56, wherein the data set of environmental conditions further comprises a soil type, a slope of the terrain and an aspect of the terrain at each of the at least one localities.

58. The method of claim 57, wherein the set of microclimate conditions comprises a temperature profile as a function of the slope of the terrain.

59. The method of claim 57, wherein the set of environmental conditions further comprises a type and abundance of plant cover.

60. The method of claim 59, wherein the set of microclimate conditions comprises a temperature profile as a function of the type and abundance of plant cover.

61. The method of claim 59, wherein the set of microclimate conditions comprises a wind profile as a function of the type and abundance of plant cover.

62. The method of claim 36, wherein the set of microclimate conditions experienced by the animal comprise a clear sky solar radiation, an infrared fluxes from the sky and ground, and a temperature, a velocity and a relative humidity of air passing over the animal at an average height of the animal above ground, and a percentage of thermally available habitat.

63. The method of claim 36, wherein the data set of animal characteristics comprises data on a body allometry, a physiology and a morphology of the animal.

64. The method of claim 63, wherein the data on the animal's body allometry comprise a body weight, a body dimensions and a body geometry of the animal.

65. The method of claim 63, wherein the data on the animal's physiology comprise a core temperature of the animal.

66. The method of claim 63, wherein the data on the animal's morphology comprise a mean length of fibers, a fiber density per depth, a fiber diameter, a depth of insulation, a solar reflectivity of fibers, and a transmissivity of fibers.

67. The method of claim 36, wherein the data set of animal characteristics comprises data provided by an animal characteristics database.

68. The method of claim 36, wherein the data set of animal characteristics further comprises data provided by a user.

69. The method of claim 68, wherein the data provided by a user comprises a diet, a preferred temperature range and an average height above ground of the animal.

70. A method of using a computer for calculating an at least one effect of a plurality of microclimate conditions on an animal, using said computer to perform the following steps comprising:
providing a data set of the plurality of microclimate conditions for an at least one locality during an at least one time interval;
providing a data set of characteristics of the animal;
solving for a set of animal conditions by running an animal model using the set of microclimate conditions and the set of animal characteristics, for each of the at least one time intervals at each of the at least one localities, the set of animal conditions comprising an amount of discretionary energy and an amount of discretionary water available to the animal, and a total activity time of the animal, the running of the animal model, comprising:
calculating an amount of metabolic heat generation required to maintain a core temperature of the animal and noting an activity state of the animal, by performing a heat balance analysis, the activity state being chosen from the group consisting of active and non-active;
calculating the amount of discretionary energy available to the animal and the amount of discretionary water available to the animal by performing a mass balance analysis using the calculated amount of metabolic heat generation, the performing the mass balance analysis comprising running a gut model coupled to a lung model; and,
calculating the total activity time of the animal by summing the at least one time intervals at which the activity state of the animal was noted to be active.

71. The mass balance analysis of claim 70, further comprising running a skin subroutine to calculate an amount of water loss by evaporation at the skin of the animal.

72. The method of claim 70, further comprising storing the set of animal conditions data in an animal conditions database.

73. The method of claim 70, further comprising calculating an at least one user-specifiable variable using the data stored in the animal conditions database.

74. The method of claim 70, wherein the at least one user-specifiable variable comprises a reproductive potential of the animal calculated by using the amounts of discretionary energy and water available to the animal.

75. The method of claim 70, wherein the at least one user-specifiable variable comprises a growth potential of the animal calculated by using the amounts of discretionary energy and water available to the animal.

76. The method of claim 70, wherein the at least one user-specifiable variable comprises a mortality rate of the animal calculated by using the total activity time of the animal.

77. The method of claim 70, wherein the at least one user-specifiable variable comprises an optimal body size of the animal for the at least one locality and for the at least one time interval.

78. The method of claim 70, further comprising displaying the set of animal conditions data.

79. The method of claim 70, wherein displaying the set of animal conditions comprises plotting the set of animal conditions by locality to analyze a spatial variation in the animal conditions.

80. The animal model of claim 70, wherein performing the heat balance analysis comprises:
  computing an amount of solar radiation absorbed by the animal;
  estimating the amount of metabolic heat generation required to maintain the core temperature of the animal;
  computing a skin temperature of the animal using the estimated amount of metabolic heat generation and the computed amount of solar radiation absorbed by the animal;
  calculating a plurality of heat fluxes between the animal and its environment and calculating a net heat exchange for the animal;
  solving a heat balance equation to compute an error value;
  if the error value is greater than a pre-specified maximum value, repeating the previous steps from the estimating the amount of metabolic heat generation step to the current step;
  if the error value is less than or equal to the pre-specified maximum value, running a thermoregulatory model comprising;
    computing a core-skin temperature differential as the difference between the core temperature of the animal and the skin temperature of the animal and comparing the core-skin temperature differential to a pre-specified minimum value;
    if the core-skin differential is less than the pre-specified minimum value, exercising an option in a hierarchy of behavioral and physiological options, and repeating the previous steps from the estimating the amount of metabolic heat generation step to the computing a core-skin temperature differential step; and,
    if the core-skin differential is greater than or equal to the pre-specified minimum value, selling the calculated value for metabolic heat generation equal to the estimated value of the amount of metabolic heat generation.

81. The method of claim 80, wherein the calculating a plurality of heat fluxes comprises running a porous media model for insulation.

82. The method of claim 81, wherein the porous media model comprises a solar radiation component to calculate an amount of solar radiation absorbed by the animal.

83. The method of claim 81, wherein the porous media model further comprises an appendage model to calculate an amount of heat exchange at an at least one appendage of the animal.

84. The method of claim 70, wherein each of the at least one localities is defined by a set of geographic coordinates.

85. The method of claim 70, wherein the at least one time intervals comprise hours, days, months and a year.

86. The method of claim 70, wherein the set of microclimate conditions experienced by the animal comprise a clear sky solar radiation, an infrared fluxes from the sky and ground, and a temperature, a velocity and a relative humidity of air passing over the animal at an average height of the animal above ground, and a percentage of thermally available habitat.

87. The method of claim 70, wherein the data set of animal characteristics comprises data on a body allometry, a physiology and a morphology of the animal.

88. The method of claim 87, wherein the data on the animal's body allometry comprise a body weight, a body dimensions and a body geometry of the animal.

89. The method of claim 87, wherein the data on the animal's physiology comprise a core temperature of the animal.

90. The method of claim 87, wherein the data on the animal's morphology comprise a mean length of fibers, a fiber density per depth, a fiber diameter, a depth of insulation, a solar reflectivity of fibers, and a transmissivity of fibers.

91. The method of claim 70, wherein the data set of animal characteristics comprises data provided by an animal characteristics database.

92. The method of claim 91, wherein the data set of animal characteristics further comprises data provided by a user.

93. The method of claim 92, wherein the data provided by a user comprises a diet, a preferred temperature range and an average height above ground of the animal.

* * * * *

UNITED STATES PATENT AND TRADEMARK OFFICE
CERTIFICATE OF CORRECTION

| | | |
|---|---|---|
| PATENT NO. | : 7,155,377 B2 | Page 1 of 1 |
| APPLICATION NO. | : 09/938196 | |
| DATED | : December 26, 2006 | |
| INVENTOR(S) | : Warren P. Porter et al. | |

It is certified that error appears in the above-identified patent and that said Letters Patent is hereby corrected as shown below:

Col. 1, line 6, insert the following Statement Regarding Federally Sponsored Research or Development:

This invention was made with United States government support awarded by the following agency:

DOE    DE-AC02-76EV02270 #14

Signed and Sealed this

Twenty-seventh Day of March, 2007

JON W. DUDAS
*Director of the United States Patent and Trademark Office*